(12) United States Patent
Hultgren et al.

(10) Patent No.: US 9,592,657 B1
(45) Date of Patent: Mar. 14, 2017

(54) COMPRESSION MOLDING OF CARBON FIBER TUBULAR POLE

(71) Applicant: Nanette L. Hultgren, Palmetto, FL (US)

(72) Inventors: Nanette L. Hultgren, Palmetto, FL (US); Steven C Austin, Palmetto, FL (US)

(*) Notice: Subject to any disclaimer, the term of this patent is extended or adjusted under 35 U.S.C. 154(b) by 268 days.

(21) Appl. No.: 14/330,541

(22) Filed: Jul. 14, 2014

Related U.S. Application Data

(63) Continuation-in-part of application No. 13/841,360, filed on Mar. 15, 2013, now Pat. No. 8,778,123,
(Continued)

(51) Int. Cl.

| | |
|---|---|
| B29C 65/00 | (2006.01) |
| B32B 37/00 | (2006.01) |
| B32B 38/10 | (2006.01) |
| B32B 38/00 | (2006.01) |
| B32B 37/02 | (2006.01) |
| B32B 38/08 | (2006.01) |
| B32B 1/08 | (2006.01) |
| B32B 9/00 | (2006.01) |
| B29C 63/18 | (2006.01) |

(Continued)

(52) U.S. Cl.
CPC .......... *B32B 38/0012* (2013.01); *B32B 1/08* (2013.01); *B32B 9/007* (2013.01); *B32B 37/02* (2013.01); *B32B 38/08* (2013.01); *B29C 63/0021* (2013.01); *B29C 63/18* (2013.01); *B29C 65/70* (2013.01); *B29C 66/005* (2013.01); *B29C 66/5221* (2013.01); *B29C 66/7212* (2013.01); *B32B 2038/0016* (2013.01); *B32B 2038/0028* (2013.01); *B32B 2038/0076* (2013.01); *B32B 2262/106* (2013.01); *B32B 2597/00* (2013.01)

(58) Field of Classification Search
CPC . B32B 37/00; B32B 37/10; B32B 2037/1253; B32B 38/0012; B32B 38/08; B32B 37/02; B29C 65/483; B29C 66/5221; B29C 63/0021; B29C 63/18; B29C 65/70; B29C 66/005; B29C 66/7212; B29D 23/00; F16C 3/026
USPC ......... 156/60, 148, 149, 153, 160, 161, 165, 156/184, 185, 187, 188, 189, 190, 191, 156/196, 212, 213, 215, 217, 218, 229, 156/247, 249, 278, 280, 289, 293, 294, 156/296, 303.1, 307.1, 307.3, 307.7, 701, 156/154
See application file for complete search history.

(56) References Cited

U.S. PATENT DOCUMENTS

| | | |
|---|---|---|
| 3,673,029 A | 6/1972 | McLarty |
| 3,941,633 A | 3/1976 | Wang et al. |

(Continued)

FOREIGN PATENT DOCUMENTS

| | | | |
|---|---|---|---|
| JP | 01208123 A | * | 8/1989 |
| JP | 2004174929 A | * | 6/2004 |

*Primary Examiner* — Philip Tucker
*Assistant Examiner* — Brian R Slawski
(74) *Attorney, Agent, or Firm* — Frijouf, Rust & Pyle P.A

(57) ABSTRACT

An apparatus and method is disclosed for making a carbon fiber tubular component by sliding a carbon fiber sleeve and a fiber sleeve over a tubular mandrel. The sleeves overlying the tubular mandrel are saturated with a curable resin and inserted into a mold cavity of a compression mold. The cured carbon fiber tubular component is removed from the compression mold after the curing of the resin.

9 Claims, 27 Drawing Sheets

Related U.S. Application Data which is a continuation-in-part of application No. 13/328,289, filed on Dec. 16, 2011, now Pat. No. 8,845,845.

(51) Int. Cl.
*B29C 65/70* (2006.01)
*B29C 63/00* (2006.01)

(56) References Cited

U.S. PATENT DOCUMENTS

| | | | | |
|---|---|---|---|---|
| 4,214,932 | A | * | 7/1980 | Van Auken ............ B65H 81/06 138/141 |
| 4,222,808 | A | * | 9/1980 | Hale ....................... B29C 33/68 156/245 |
| 4,248,062 | A | | 2/1981 | McLain et al. |
| 4,647,326 | A | | 3/1987 | Pott |
| 5,645,668 | A | | 7/1997 | Lin et al. |
| 6,238,506 | B1 | * | 5/2001 | Satoh ....................... B62D 1/04 156/169 |
| 6,336,986 | B1 | * | 1/2002 | Lee ....................... B29C 70/088 156/160 |
| 8,778,123 | B1 | | 7/2014 | Hultgren |
| 8,845,845 | B1 | | 9/2014 | Hultgren |
| 2002/0119269 | A1 | * | 8/2002 | Bardin ....................... B32B 1/08 428/36.1 |
| 2007/0261788 | A1 | * | 11/2007 | Stenard .................. B29C 33/40 156/307.1 |
| 2009/0236091 | A1 | * | 9/2009 | Hammami .......... B29C 53/8016 166/242.1 |
| 2011/0247475 | A1 | * | 10/2011 | Yamamoto ............... G10D 3/16 84/325 |

\* cited by examiner

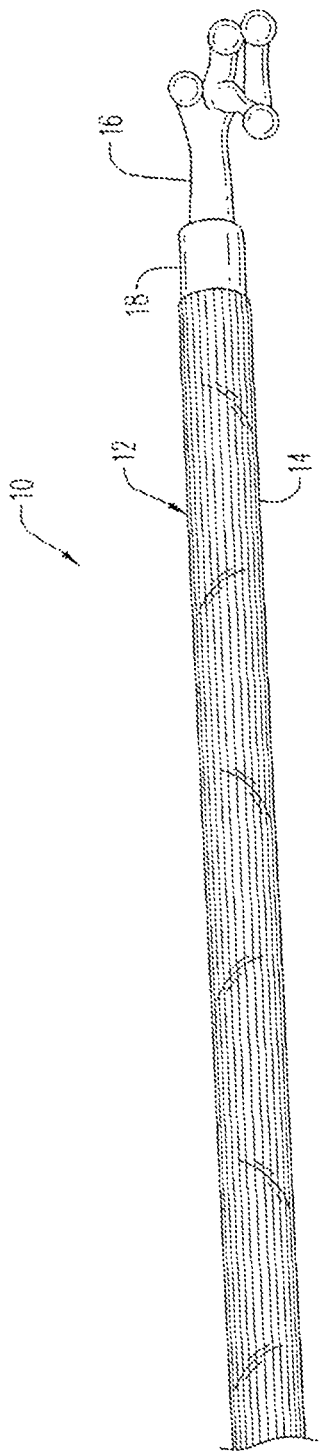
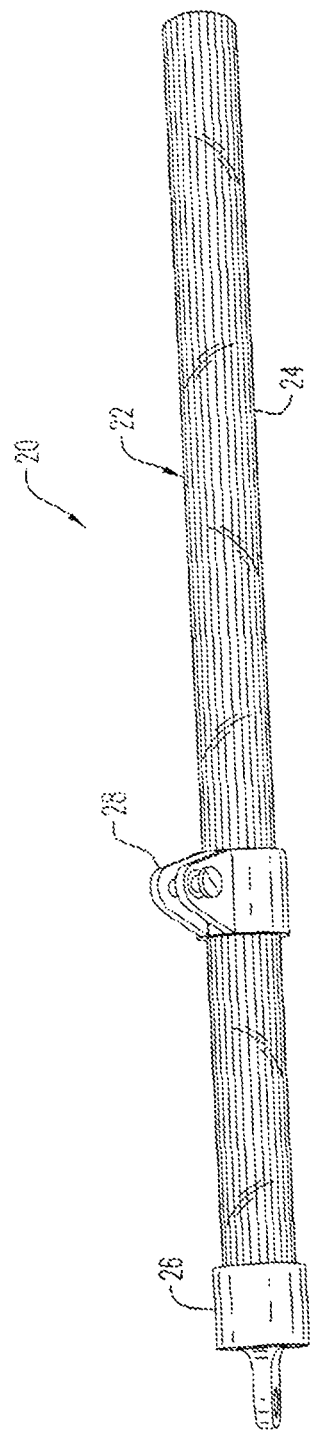
FIG. 1
FIG. 2

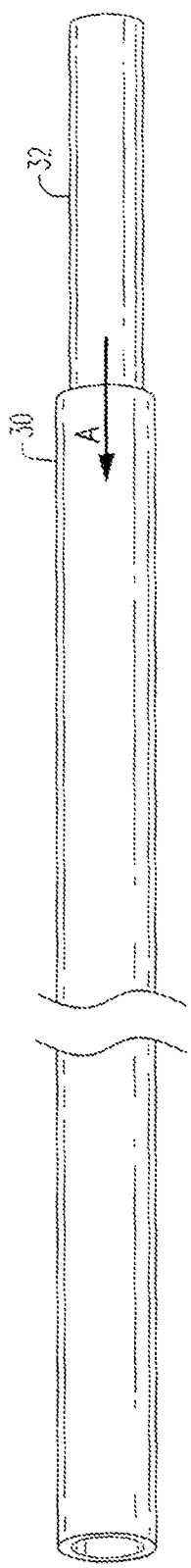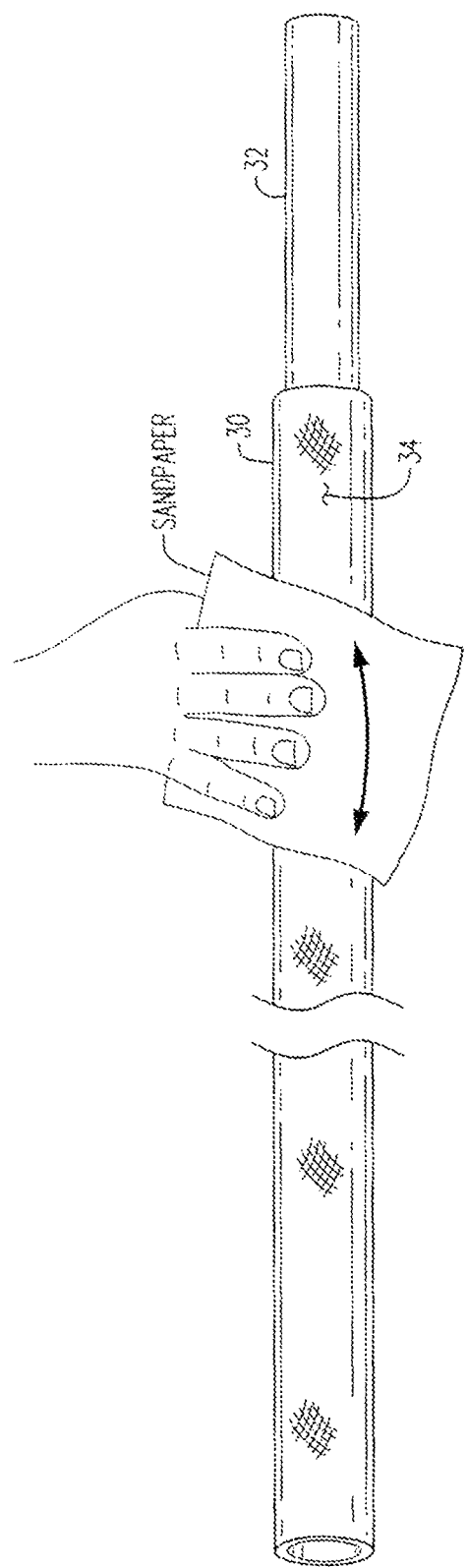
FIG. 3
FIG. 4

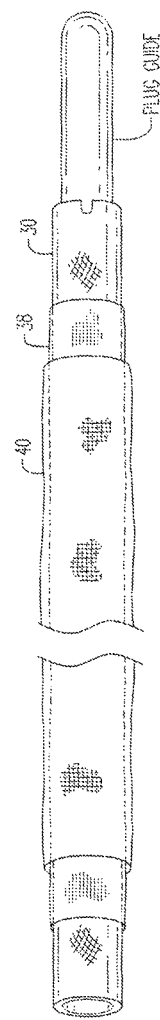
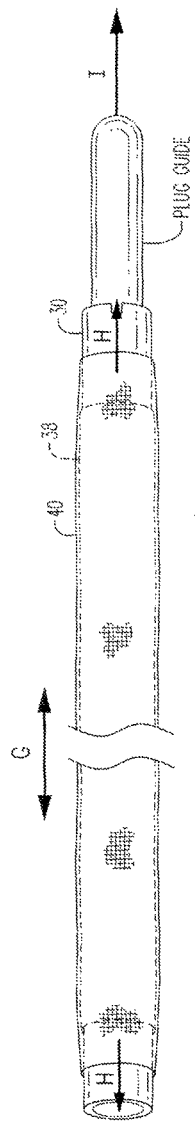
FIG. 11
FIG. 12

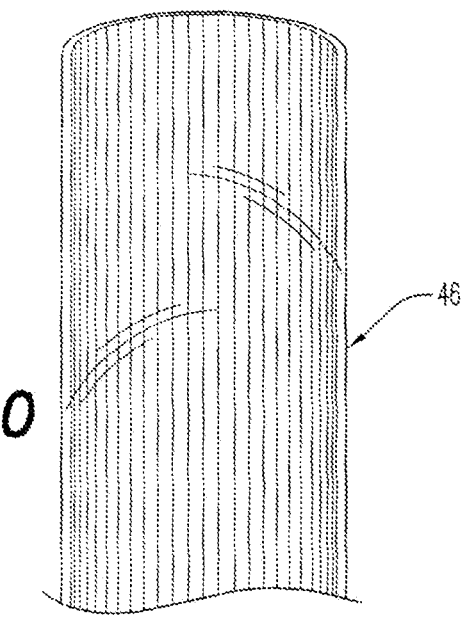
FIG. 20
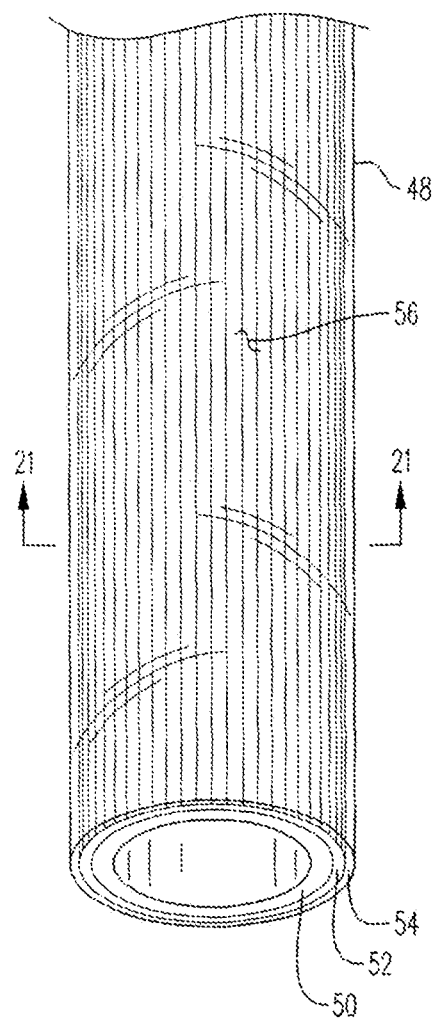

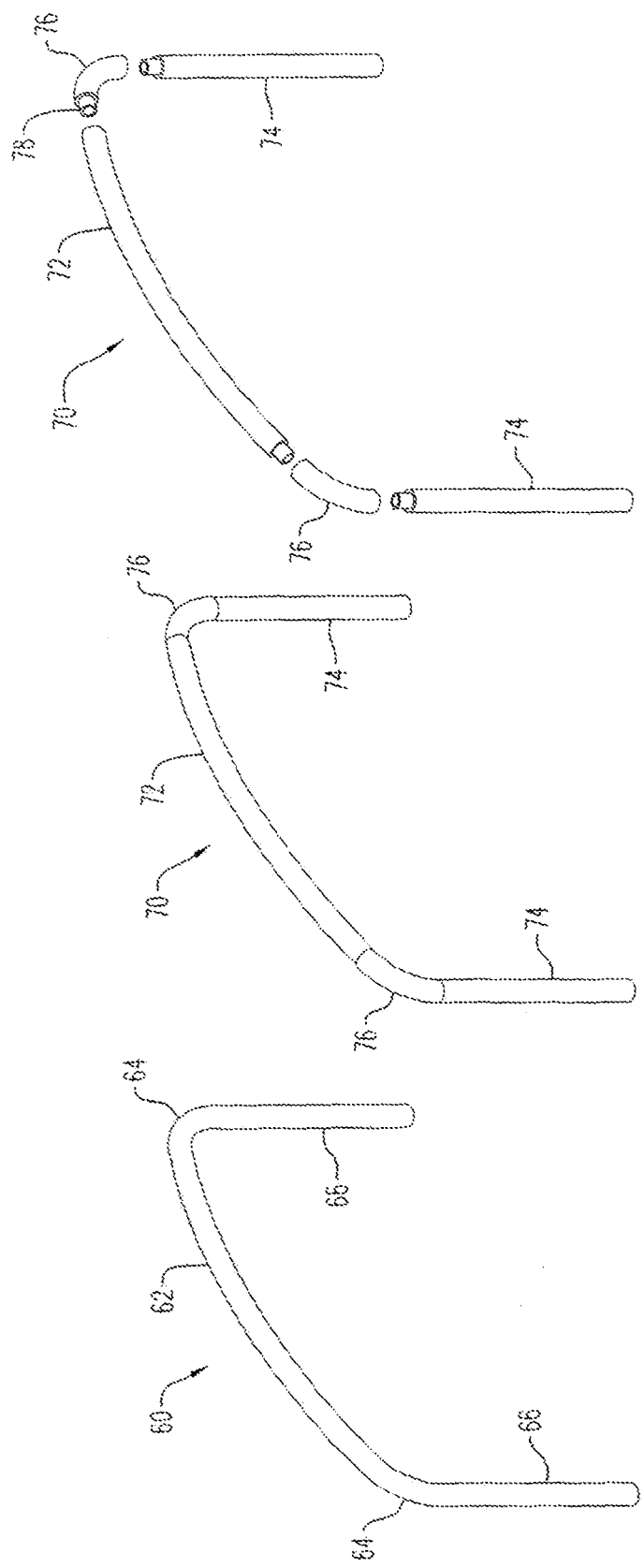

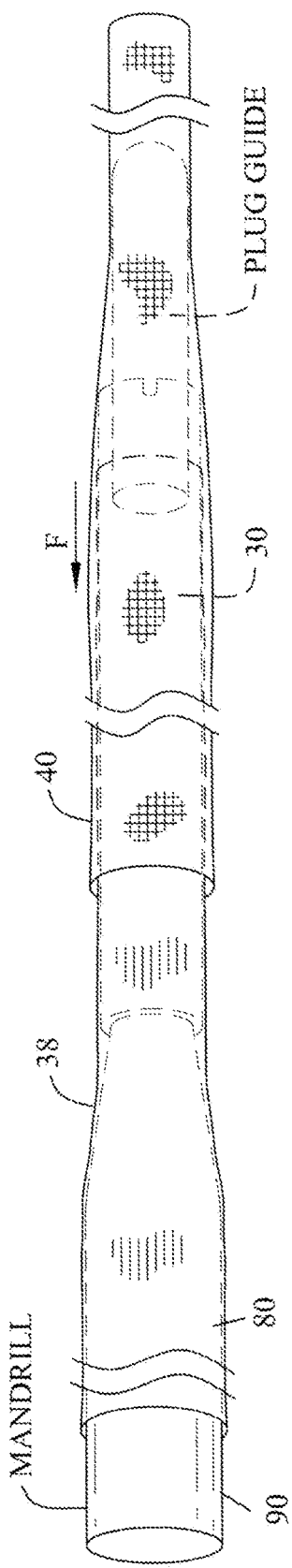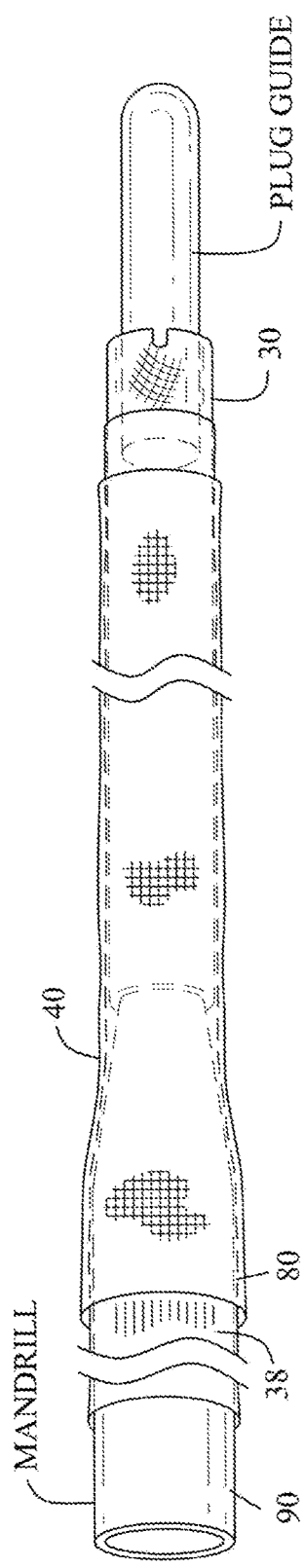

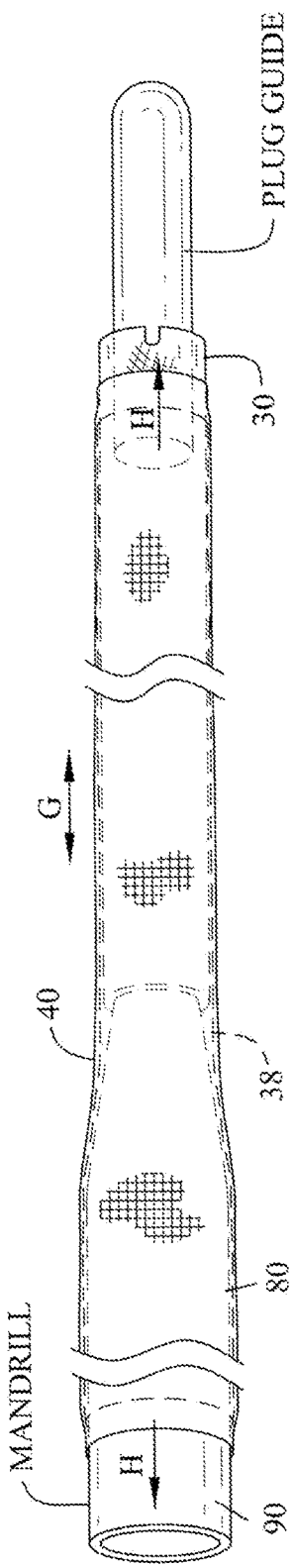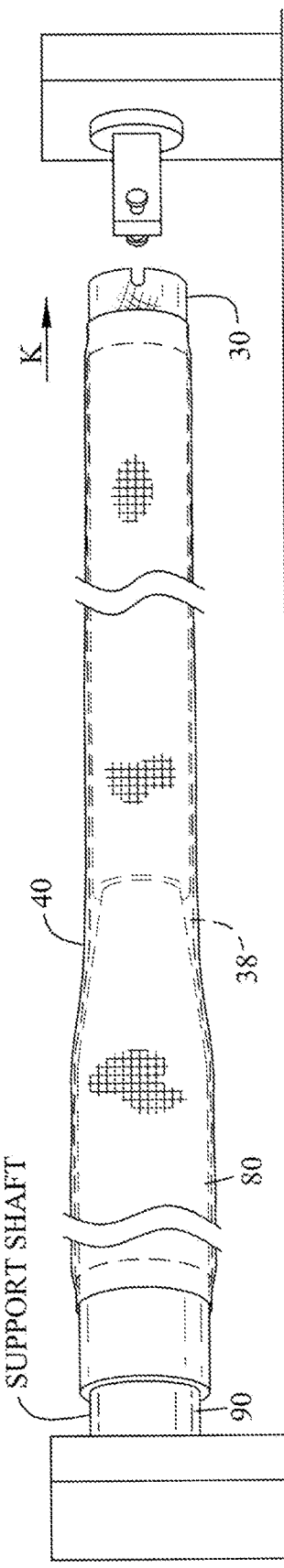
FIG. 29
FIG. 30

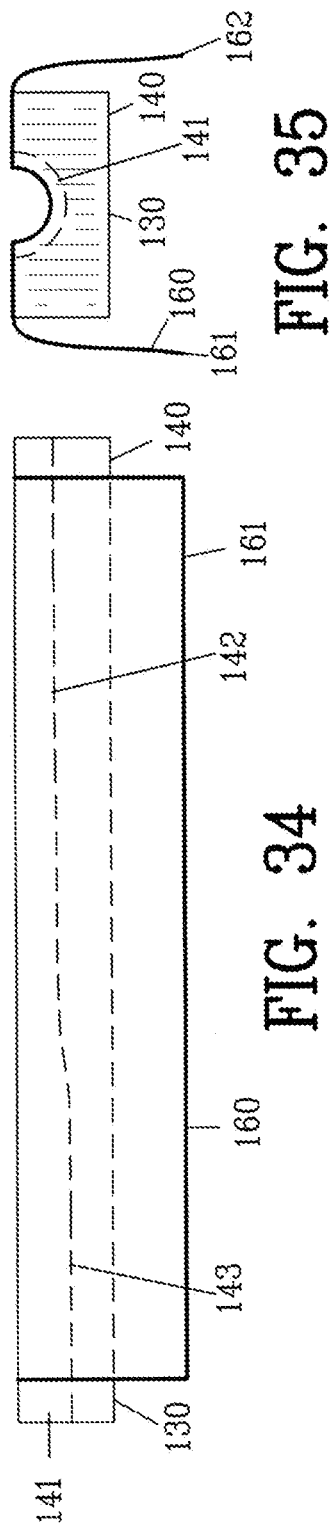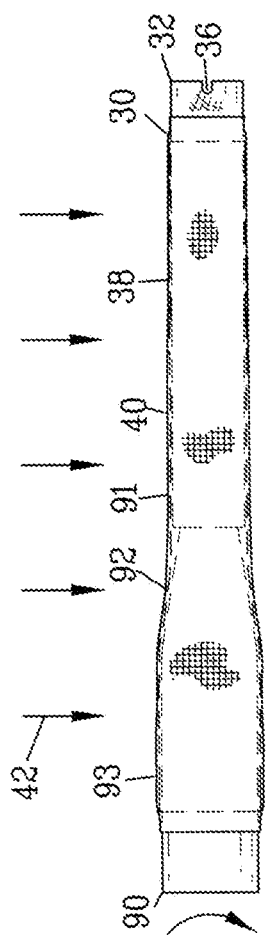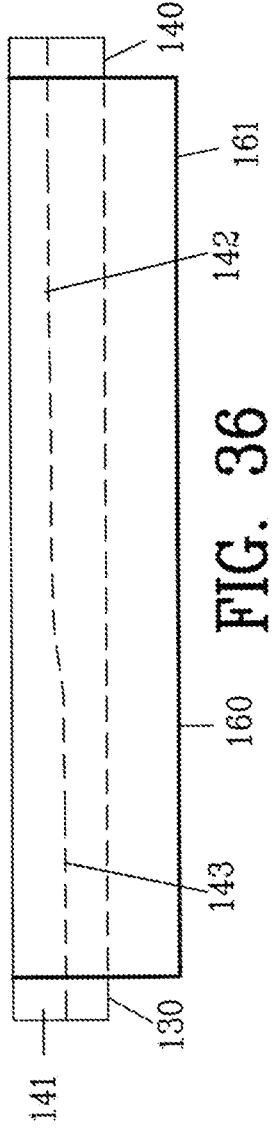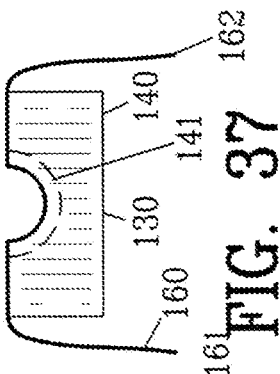
FIG. 34
FIG. 35
FIG. 36
FIG. 37

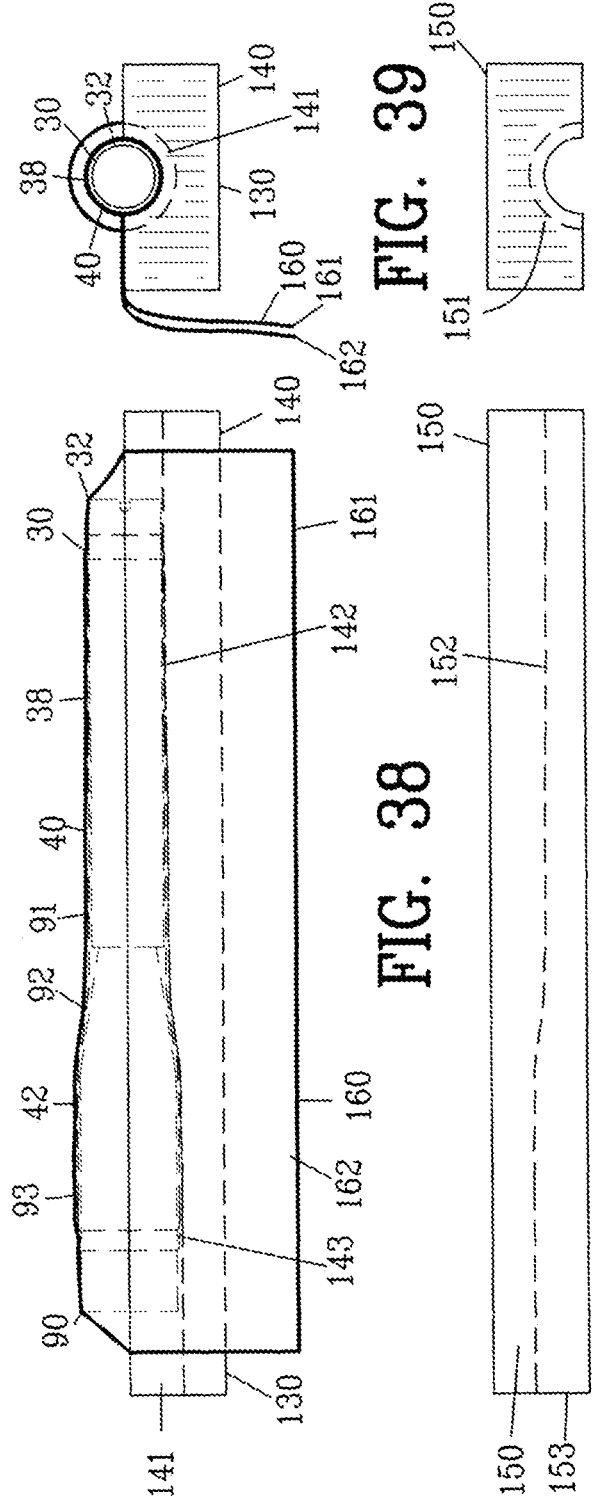
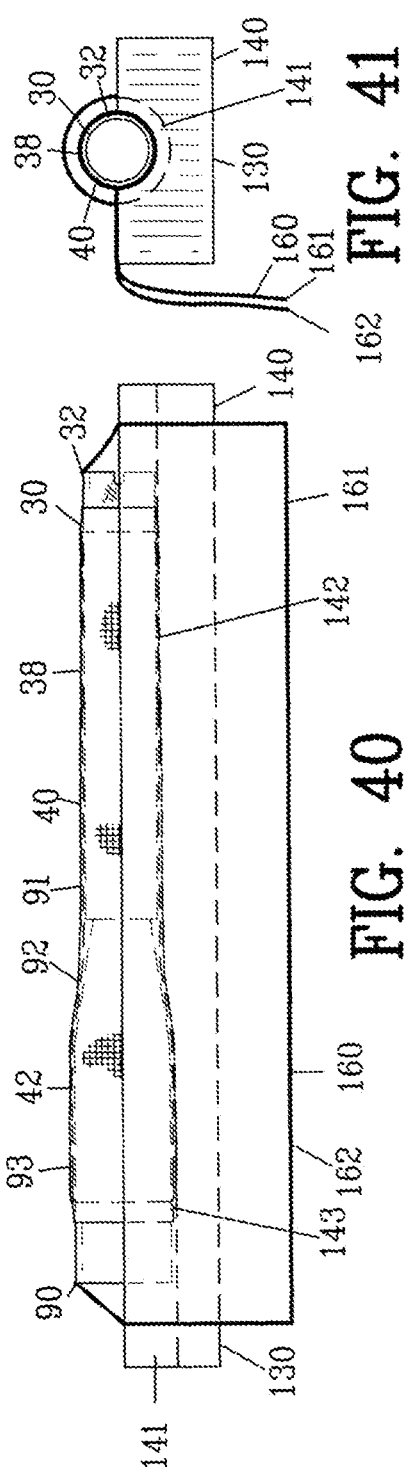

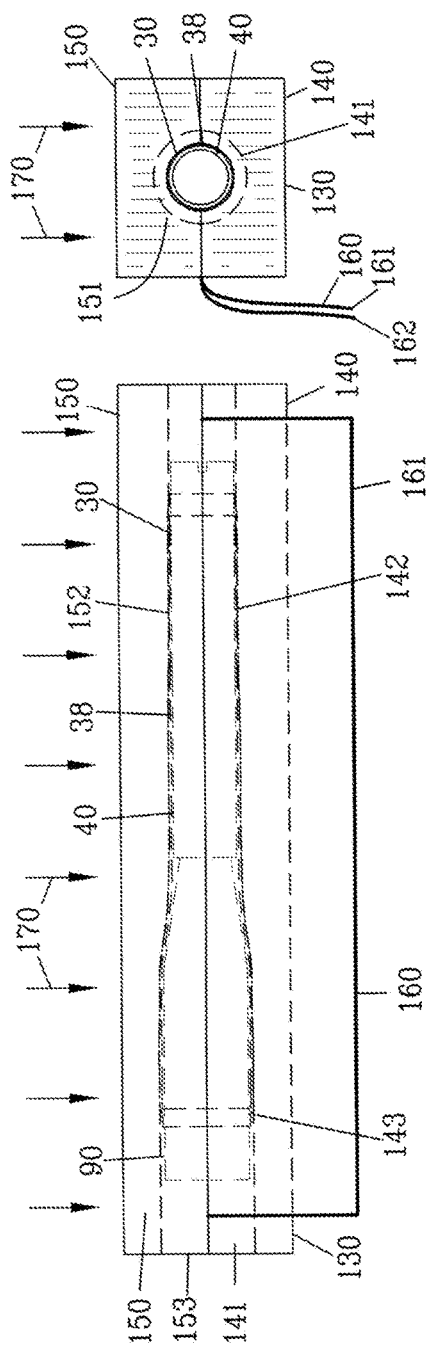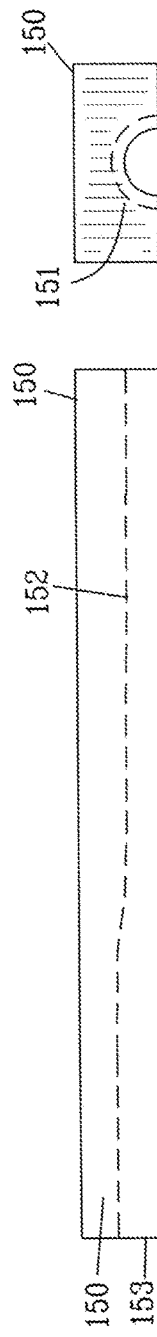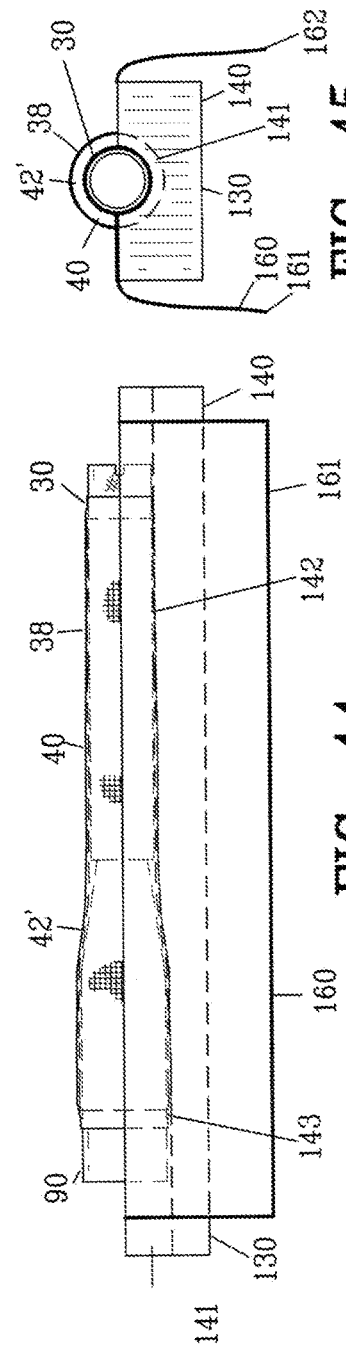

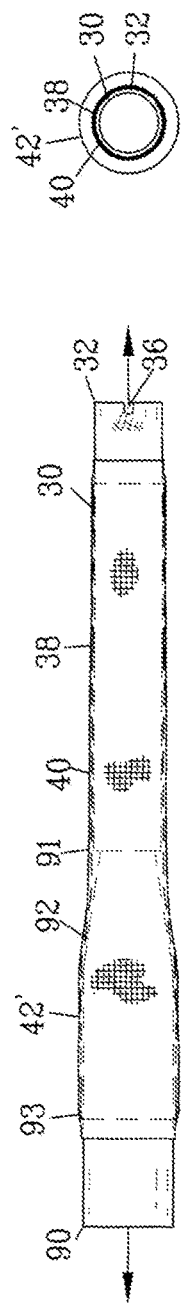
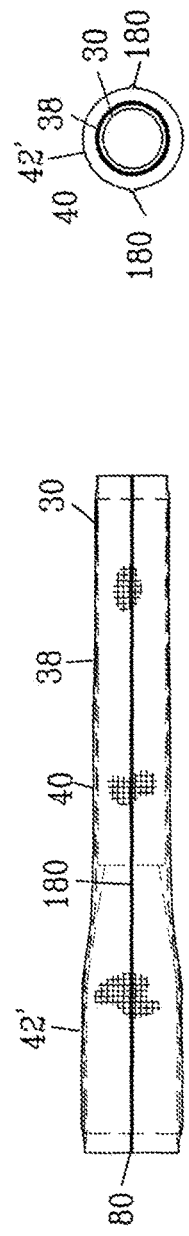

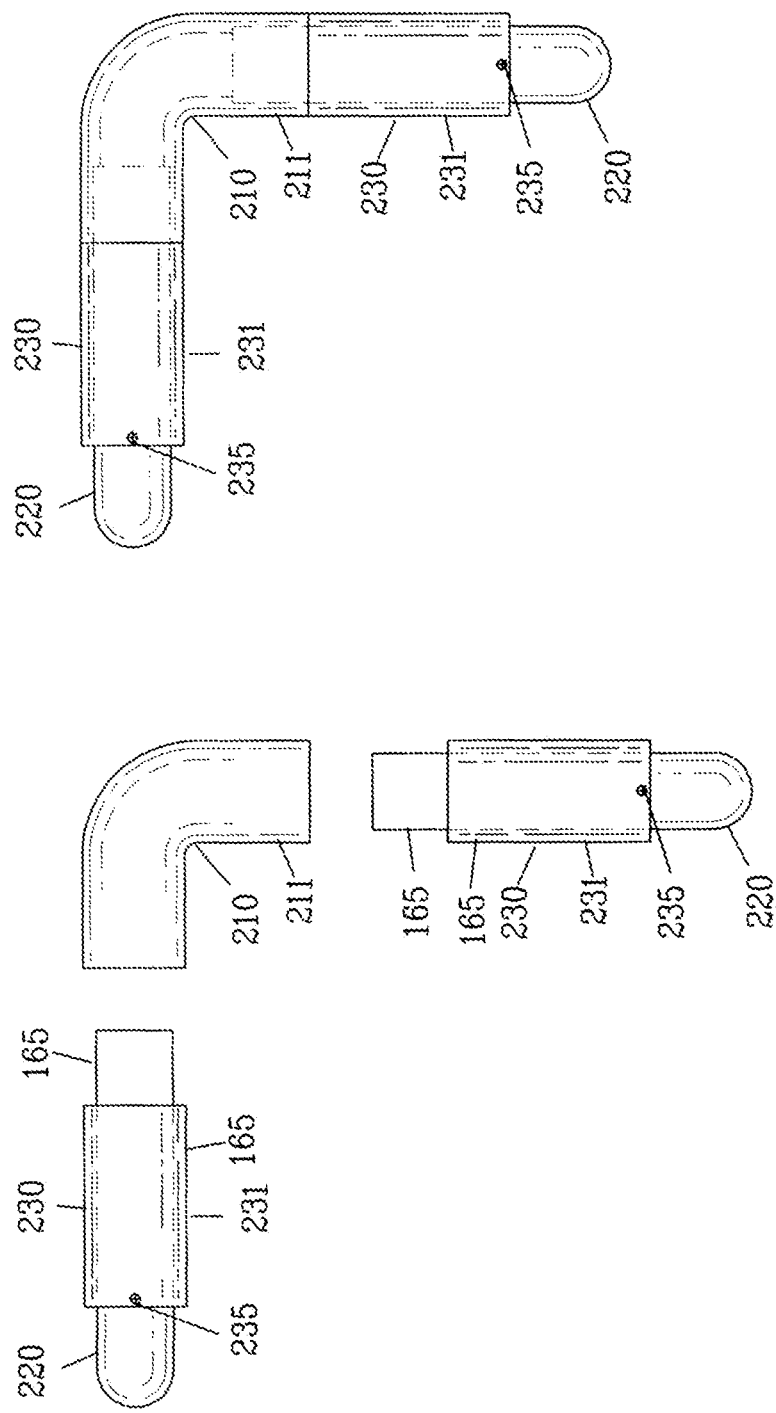

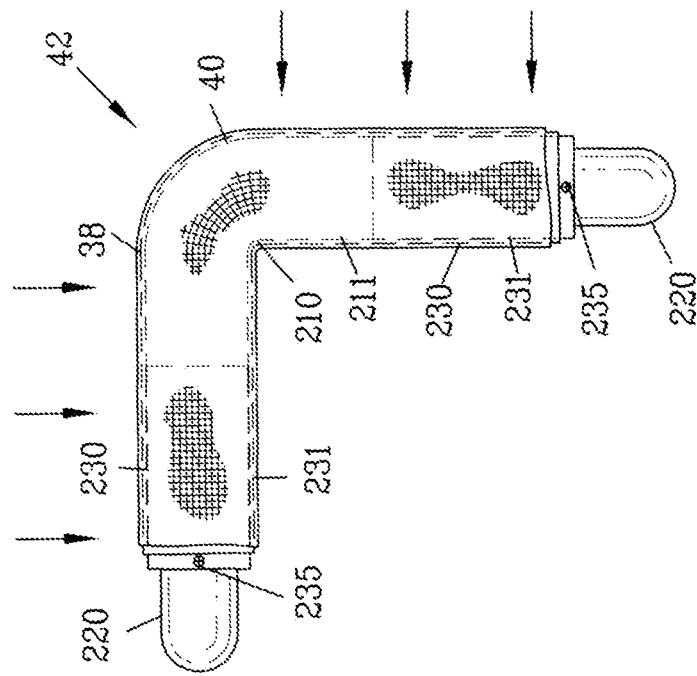
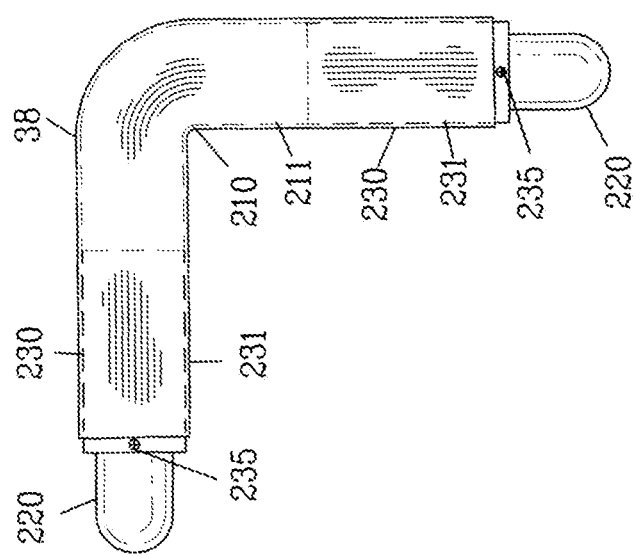

COMPRESSION MOLDING OF CARBON FIBER TUBULAR POLE

CROSS-REFERENCE TO RELATED APPLICATIONS

This is a continuation-in-part of U.S. patent application Ser. No. 13/841,360, filed Mar. 15, 2013, now U.S. Pat. No. 8,778,123, which is a continuation-in-part of U.S. patent application Ser. No. 13/328,289, filed Dec. 16, 2011, now U.S. Pat. No. 8,845,845.

BACKGROUND OF THE INVENTION

Field of the Invention

This invention relates generally to the construction and manufacture of tubular pole members having a distinctive appearance of black carbon fiber, and more particularly to such a pole or contoured support member and method of forming same at a substantially reduced cost of manufacture.

Description of the Related Art

Tubular poles and structural contoured members formed of sleeve carbon fiber are well known. The enhanced strength and overall appearance of the black carbon fiber material greatly enhances the strength and aesthetic value despite the greatly exaggerated cost of manufacturing such a product in lieu of similar conventional tubular aluminum product. However, the well-known method for manufacturing such a carbon fiber pole which may typically only be made in a shorter, straight configuration in the carbon fiber industry is through the use of high-tech procedures such as autoclaving and microfilament machines which enable the removal of a mandrel prior to the complete curing of resin saturated into the carbon fiber material. Moreover, when manufacturing smaller diameter carbon fiber tubular members having a diameter of less than 1", removal of the support mandrel becomes exceedingly difficult.

Further, because the cured carbon fiber tubular structure cannot be formed to produce a curve such as for a bow support for a bimini top of a boat, there are no such carbon fiber products in the marketplace at this time.

The present invention provides both a structure and a method for producing both straight tubular and curved tubular support members formed of carbon fiber to provide the strength and distinctive appearance of the black sleeve while substantially reducing the cost of manufacture by simply leaving a sacrificial tubular mandrel in place within the end product structure. A mandrel is any tube made of a synthetic or fibrous material that has the properties of being round, hollow and lightweight. Examples of a synthetic pole may be PVC tubing, plastic tubing or fiberglass tubing. Such a mandrel is preferably in the form of either a light-weight tubular polyvinylchloride (PVC) tubing or cardboard tubing which are left in place and cured and become a monolithic part of the entire structure.

The present invention improves upon our prior inventions by utilizing a compression curing process for providing a carbon fiber tubular component having a superior outer finish and appearance.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved carbon fiber tubular pole and curved tubular structural member and method of construction thereof. The end product includes a left in-place lightweight mandrel, preferably formed of tubular synthetic or fibrous material, which substantially reduces cost of manufacture. Moreover, an outer tubular layer of glass fiber over a tubular carbon fiber layer and cured resin saturated through and through fiber layers maintains the aesthetic appearance of the black carbon fiber while substantially strengthening the end product.

The method of making a carbon fiber tubular pole comprises the steps of providing a tubular mandrel defining a hollow interior. A carbon fiber sleeve is slid and stretched over the tubular mandrel. A fiber sleeve is slid and stretched over the carbon fiber sleeve. The sleeves are saturated with a sufficient quantity of a curable resin through to the mandrel. The tubular mandrel with the carbon fiber sleeve and the fiber sleeve with the uncured resin is inserted into a mold cavity of a compression mold. The compression mold is compressed for compressing the carbon fiber sleeve and the fiber sleeve with the uncured resin against the tubular mandrel. The uncured resin is allowed to cure within the mold cavity and monolithically And permanently secure the tubular mandrel and the sleeves together to form the carbon fiber tubular pole. The cured carbon fiber tubular pole is removed from the mold cavity of the compression mold.

In a more specific embodiment, the step of providing a tubular mandrel includes providing an elongated linear tubular mandrel and/or an elongated curved tubular mandrel.

Preferably, the process includes the step of providing a release agent for the mold cavity of the compression mold. In one example, the step of providing a release agent includes inserting a sheet of a release agent into the mold cavity of the compression mold prior to inserting the tubular mandrel with the carbon fiber sleeve and the fiber sleeve with the uncured resin into the mold cavity of the compression mold.

In another specific example, the tubular mandrel with the fiber sleeves above the mold cavity of the compression mold. The tubular mandrel is rotated while applying a sufficient quantity of a curable resin to saturate through the sleeves to contact, with the mandrel allowing any excess curable resin to fall into the mold cavity of the compression mold.

Preferably, the process includes the step of sanding an outer surface of the tubular mandrel includes the removal of mold flashing from the cured carbon fiber tubular pole. A mixture of colloidal silica and resin may be applied over the cured carbon fiber tubular pole.

In another embodiment, the invention is incorporated into a method of making a carbon fiber tubular pole comprising the steps of providing a tubular mandrel defining a hollow interior. An enlarged bell mandrel is positioned adjacent to the tubular mandrel A carbon fiber sleeve is slid and stretched over the tubular mandrel and the enlarged bell mandrel. A fiber sleeve is slid and stretched over the carbon fiber sleeve. The sleeves are saturated with a sufficient quantity of a curable resin through to the tubular mandrel. The tubular mandrel and the enlarged bell mandrel with the carbon fiber sleeve and the fiber sleeve with the uncured resin is inserted into a mold cavity of a compression mold. The compression mold is compressed for compressing the carbon fiber sleeve and the fiber sleeve with the uncured resin against the tubular mandrel and the enlarged bell mandrel. The uncured resin is allowed to cure within the mold cavity and monolithically and permanently secure the tubular mandrel and the sleeves together to form the carbon fiber tubular pole. The cured carbon fiber tubular pole is removed from the mold cavity of the compression mold.

In another embodiment, the invention is incorporated into a carbon fiber tubular pole comprising an elongated inner lightweight tubular mandrel. A carbon fiber sleeve is stretched over the mandrel. A fiber sleeve is stretched taught over the carbon fiber sleeve. A curable resin saturated through the sleeves to the mandrel and smoothed over the carbon fiber sleeve wherein the sleeves and the mandrel are monolithically permanently bond together by a compression mold.

The invention is also incorporated into a method of making a carbon fiber tubular pole comprising the steps of providing a tubular mandrel defining a hollow interior. A carbon fiber sleeve is stretched over the tubular mandrel. A fiber sleeve is slid and stretched over the carbon fiber sleeve. The sleeves are saturated with a sufficient quantity of a curable resin through to the mandrel. The tubular mandrel with the carbon fiber sleeve and the fiber sleeve and uncured resin are inserted into a compression mold having a mold cavity. The compression mold compresses the carbon fiber sleeve and the fiber sleeve with the uncured resin against the tubular mandrel. The uncured resin is allowed to cure within the mold cavity and monolithically and permanently secure the tubular mandrel and the sleeves together to form the carbon fiber tubular pole. The cured carbon fiber tubular pole is removed from the mold cavity of the compression mold.

The invention is also incorporated into a method of making a carbon fiber tubular connector comprising the steps of providing a tubular mandrel defining a hollow interior. An enlarged removable mandrel is positioned adjacent to the tubular mandrel. A carbon fiber sleeve is slid over the tubular mandrel and the enlarged mandrel. A fiber sleeve is slid over the carbon fiber sleeve. The sleeves are saturated with a sufficient quantity of a curable resin through to the tubular mandrel. The uncured resin is allowed to cure to monolithically and permanently secure the tubular mandrel and the sleeves together to form the carbon fiber tubular connector. The enlarged removable mandrel is removed to provide a socket for receiving an adjacent carbon fiber tubular pole. The process may include the step of compressing the carbon fiber sleeve and the fiber sleeve with the uncured resin against the tubular mandrel and the enlarged mandrel.

The invention is also incorporated into a carbon fiber tubular component, comprising an inner hollow tubular mandrel. A carbon fiber sleeve overlays the inner hollow tubular mandrel. A fiber sleeve overlays the carbon fiber sleeve. A cured resin monolithically and permanently bonds the sleeves to the inner hollow tubular mandrel. One end of the carbon fiber tubular component defines socket for receiving an adjacent carbon fiber tubular pole.

The method is also incorporated into the forming of a socket in one end of the carbon fiber tubular pole for receiving an end of an adjacent fiber tubular pole.

It is therefore an object of this invention to provide carbon fiber tubular poles and curved support members which have the outward aesthetic appearance of flat black carbon fiber sleeve.

Still another object of this invention is to provide a carbon fiber tubular structure formed leaving an inner tubular mandrel in place within the structure as a manufacturing support to substantially reduce manufacturing costs.

Yet another object of this invention is to provide a carbon fiber tubular structure which is formed over a precontoured or curved tubular mandrel so as to overcome the limitation that tubular carbon fiber poles currently prohibit the contouring of cured carbon fiber pole stock after the resin has been hardened and cured.

Yet another object of this invention is to provide a method of forming tubular carbon fiber members utilizing slow rotation of the member as the resin is applied to fully saturate the carbon fiber and glass fiber layers all of the way to the tubular mandrel which insures a monolithic-like structure when cured.

The following embodiments and aspects thereof are described and illustrated in conjunction with systems, tools and methods which are meant to be exemplary and illustrative and not limiting in scope. In various embodiments one or more of the above described problems have been reduced or eliminated while other embodiments are directed to other improvements. In addition to the exemplary aspects and embodiments described above, further aspects and embodiments will become apparent by reference to the drawings and by study of the following descriptions.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention it should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a side perspective one end product produced by the methodology of the disclosure.

FIG. 2 is a side perspective view of another end product produced by the methodology of the disclosure.

FIGS. 3 to 15 are side perspective views showing the preferred steps in implementing the method of this disclosure to produce one embodiment of an end pole product of this disclosure.

FIG. 20 is a perspective view of a finished tubular carbon fiber pole.

FIG. 22 shows three perspective views of two alternate embodiments of a bimini top support bow or member as well as an exploded view of the second embodiment thereof.

FIGS. 23 to 30 are side perspective views showing steps in implementing an alternate method of this disclosure to produce a socket in an end pole product of this disclosure.

FIG. 34 view of a bottom portion of a compression mold with a release agent located within a mold cavity.

FIG. 35 is a side view of FIG. 34.

FIG. 36 is a view illustrating the application of a curable resin to sleeves overlying a tubular mandrel.

FIG. 37 is a side view of FIG. 36.

FIG. 38 is a view illustrating the insertion of the tubular mandrel with the overlying sleeves into the mold cavity with the mold release agent being positioned for protecting a top portion of the compression mold.

FIG. 39 is a side view of FIG. 38.

FIG. 40 is a view of the top mold portion of the compression mold being positioned over the bottom mold portion of a compression mold.

FIG. 41 is a side a view of FIG. 40.

FIG. 42 is a view of an application of a compressive force being applied to the compression mold.

FIG. 43 is a side view of FIG. 42.

FIG. 44 is a view of the top portion of the compression mold being removed from the bottom portion of a compression mold after curing of the resin.

FIG. 45 is a side view of FIG. 44.

FIG. 46 is a view illustrating the removal of the tubular mandrel with the cured overlying sleeves from the compression mold.

FIG. 47 is a side view of FIG. 46.

FIG. 48 is a view illustrating the fabricated carbon fiber tubular component with a socket defined in an end of the carbon fiber tubular component.

FIG. 49 is a side view of FIG. 48.

FIG. 52 is an exploded view of removable mandrels and a curved tubular mandrel.

FIG. 53 is a view illustrating the insertion of a removable mandrel into a curved tubular mandrel.

FIG. 54 is a view illustrating the insertion of a carbon fiber sleeve over the removable mandrel and the curved tubular mandrel.

FIG. 55 is a view illustrating the insertion of a fiber sleeve over carbon fiber sleeve and the application of a curable resin.

Figure 5:
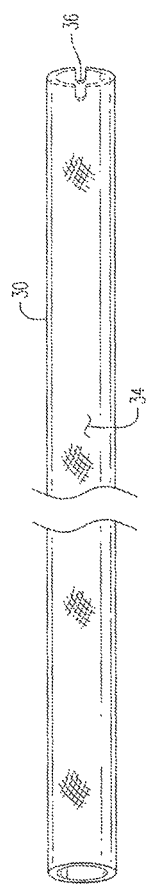
Figure 6:
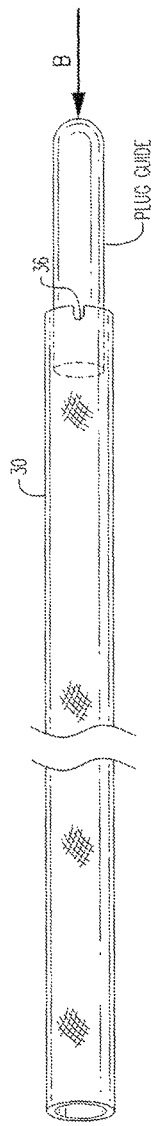

Exemplary embodiments are illustrated in reference figures of the drawings. It is intended that the embodiments and figures disclosed herein are to be considered to be illustrative rather than limiting. Similar reference characters refer to similar parts throughout the several Figures of the drawings.

DETAILED DISCUSSION

Referring to the drawings, and firstly to FIGS. 1 and 2, two finished products produced by the methodology of the present disclosure are there shown generally at numerals 10 and 20. In FIG. 1, the boat pole assembly 10 is formed of an elongated pole assembly 12 which includes a tubular carbon fiber pole 14 having a finishing end cap 18 which lockingly receives a boat hook. 16 held therewithin, the shaft of which extends partway into the tubular pole 14. The finished appearance shown as being transparent is that of a longitudinally stranded carbon fiber linear sleeve therebeneath. In FIG. 2, a bimini brace is shown at 20 and also includes an elongated carbon fiber brace assembly 22 formed of an elongated tubular carbon fiber 6 pole 24. The bimini brace 20, being shown as a product example, also includes an end fitting 26 and a mid-span pivot bracket 28 lockingly positioned and functioning in a conventional manner.

Referring now to FIGS. 3 to 15, the methodology of this disclosure producing the product shown typically shown in FIGS. 1 and 2, is there shown. In FIG. 3, an elongated removable support rod 32, preferably harmed of aluminum or copper, is inserted into a length of polyvinylchloride (PVC) mandrel 30, the PVC mandrel 30 forming a permanent part of each end product. The support rod 32 is slid into the hollow interior of the mandrel 30 in the direction of arrow A. Thereafter, the outer surface 34 of the mandrel 30, supported by the support rod 32, is sanded and roughened so as to better adhere to resin applied thereover in a later step.

Figure 7:
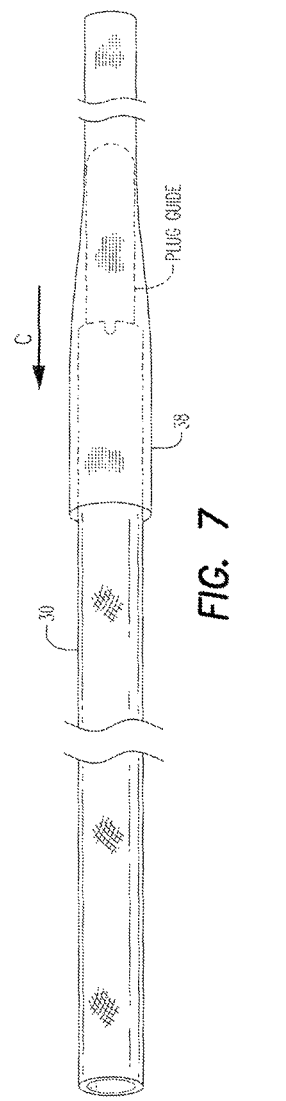
Figure 8:
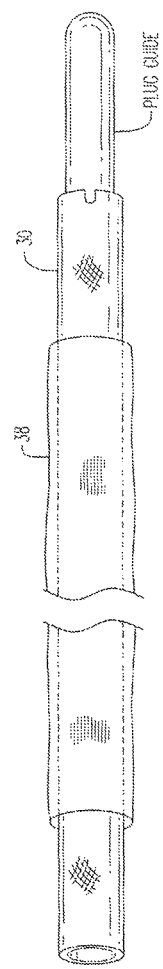
Figure 9:
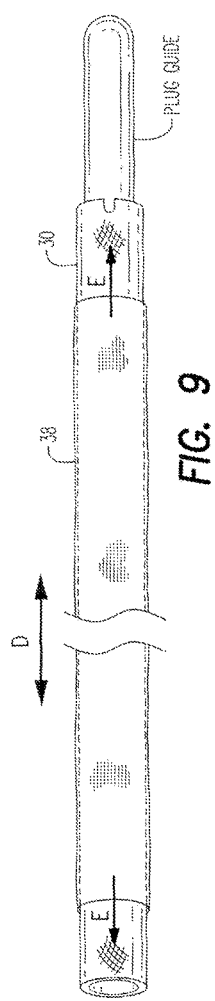
Figure 10:
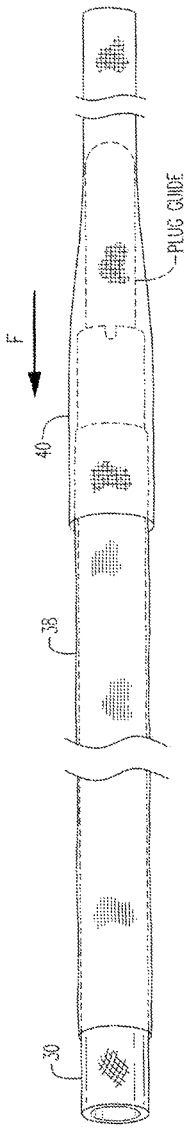

As seen in FIG. 5, driving notches 36 are formed into one end of the mandrel 30 after which a plug guide is slid part way into that same end of the mandrel 30 in the direction of arrow B. The rounded distal end of the plug guide is left exposed so that, as seen in FIG. 7, a length of tubular carbon fiber sleeve 38 may be easily sliding engaged onto the outer surface of the mandrel 30 in the direction of arrow C. Once this carbon fiber sleeve 38 is fully in place over the mandrel 30 as shown in FIG. 8, the carbon fiber sleeve 38 is manually stretched as arrow D in the direction of arrows E in FIG. 9 so as to more tightly conform against the exterior surface of the mandrel 30. Thereafter, as seen in FIG. 10, a length of tubular glass fiber sleeve 40 is slid over the top of the carbon fiber sleeve 38 in the direction of arrow F. Once the glass fiber sleeve 40 is in position over the previously stretched and tensioned carbon fiber sleeve 38, the glass fiber sleeve 40 is also stretched in the direction of arrows G and tensioned in the direction of arrows H by manual manipulation thereof to insure outstretched and tightened position of the glass fiber sleeve 40. This manipulation is similar to the collapsing and tightening of "Chinese handcuffs".

The preferred carbon fiber sleeve is formed of either tubular biaxial or unidirectional carbon fiber material. The preferred glass fiber sleeve is roving biaxial sleeving.

This entire arrangement shown in FIG. 12 is then positioned onto a rotary apparatus by sliding the driving notch 36 into engagement on driving pin of the drive shaft of the rotary, after which the support shaft is moved into the opposite end of the mandrel 30 in the direction of arrow J.

Figure 15:
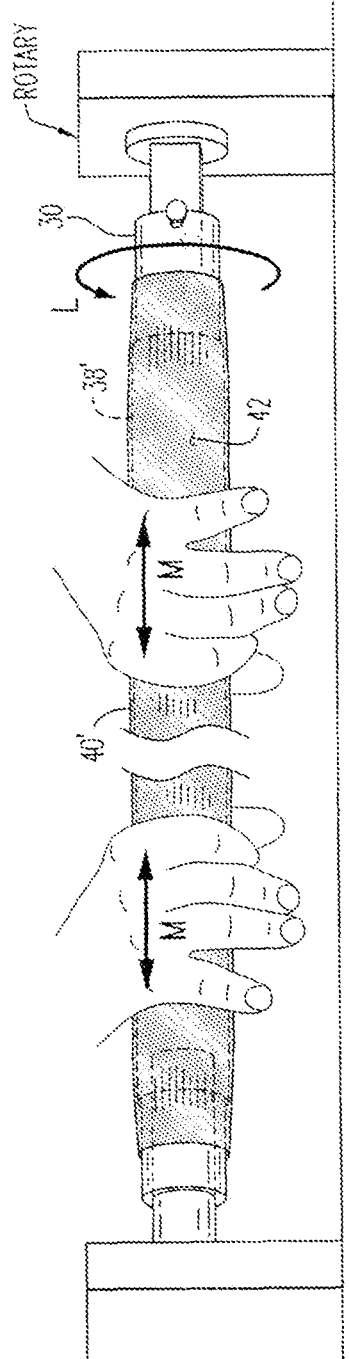

The rotary is then activated to slowly (about 1 to 5 RPM) rotate the mandrel 30 in the direction of arrow L simultaneously with brush application of uncured resin 42 applied over all of the exterior surface of the glass fiber sleeve 40. The resin 42 may be vinyl or polyester epoxy and of sufficiently low viscosity so as to fully penetrate through both the glass fiber sleeve 40 and the carbon fiber sleeve 38 to fully saturate those layers down to the outer surface of the mandrel 30. As seen in FIG. 15, thereafter a user wearing protective vinyl or latex gloves then smoothes the entire arrangement of resin 42 glass fiber and carbon fiber sleeves 38 and 40 by movement manually in the direction of arrows M while squeezing. The preferred resin is a low viscosity epoxy using a no flushing hardener, slow, medium, or fast curing depending upon ambient temperature.

Figure 16:
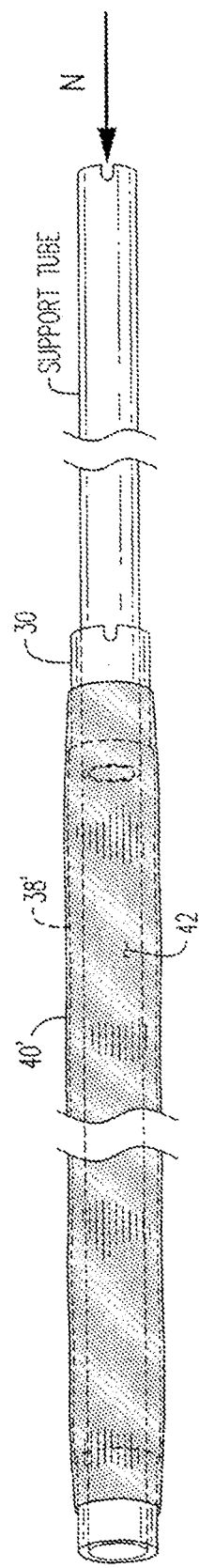
FIG. 16 is a side perspective view showing inserting an alternate support tube within the tubular mandrel for temporarily supporting larger diameter poles during manufacture.

For smaller diameter products, curing of the resin may take place while being held with or without rotation within the rotary shown in FIG. 15. However, where the diameter of the end product exceeds about 1", it is preferred that a support tube be inserted into the mandrel 30 as shown in FIG. 16. The mandrel 30, being non-porous with respect to uncured resin 42, will prevent any resin 42 from contacting the outer surface of the support tube, eliminating any risk that the support tube may not be easily removed after the resin 42 applied to the outer surface shown in FIGS. 14 and 15 has cured.

Figure 17:
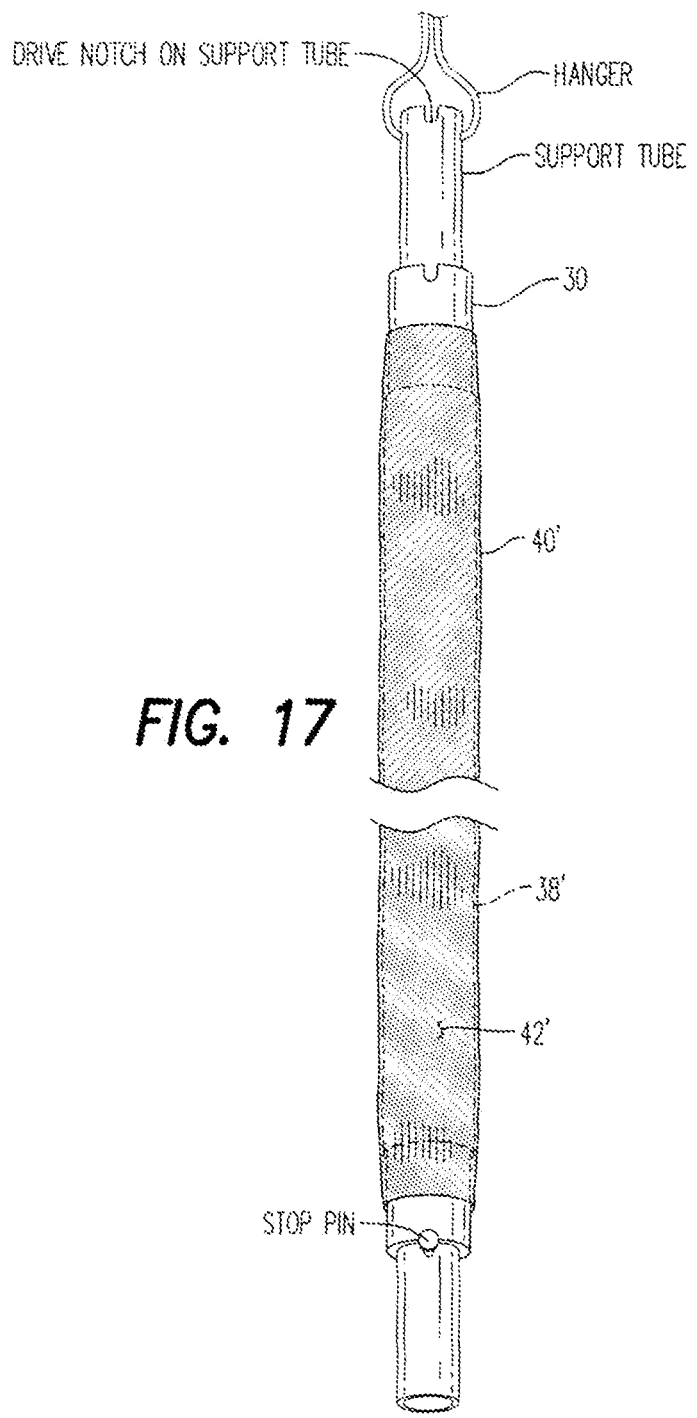
FIG. 17 shows an optional step in the resin curing process for the tubular pole produced in FIG. 16 within the scope of this disclosure.

Once this support tube is inserted in the direction of arrow N as seen in FIG. 16, the ends of the support tube may be held horizontally or, as seen in FIG. 17, for larger diameter end product, the support tube may be attached to and hung vertically by a hanger at an upper end and, to prevent the mandrel 30 from sliding downwardly, a stop pin may be inserted through the opposite end of the support tube. The work product is being held vertically so as to insure a perfectly straight pole end product and without the risk of the resin running which is insured by the careful, even distribution of all uncured resin in the step shown in FIG. 15.

Figure 18:
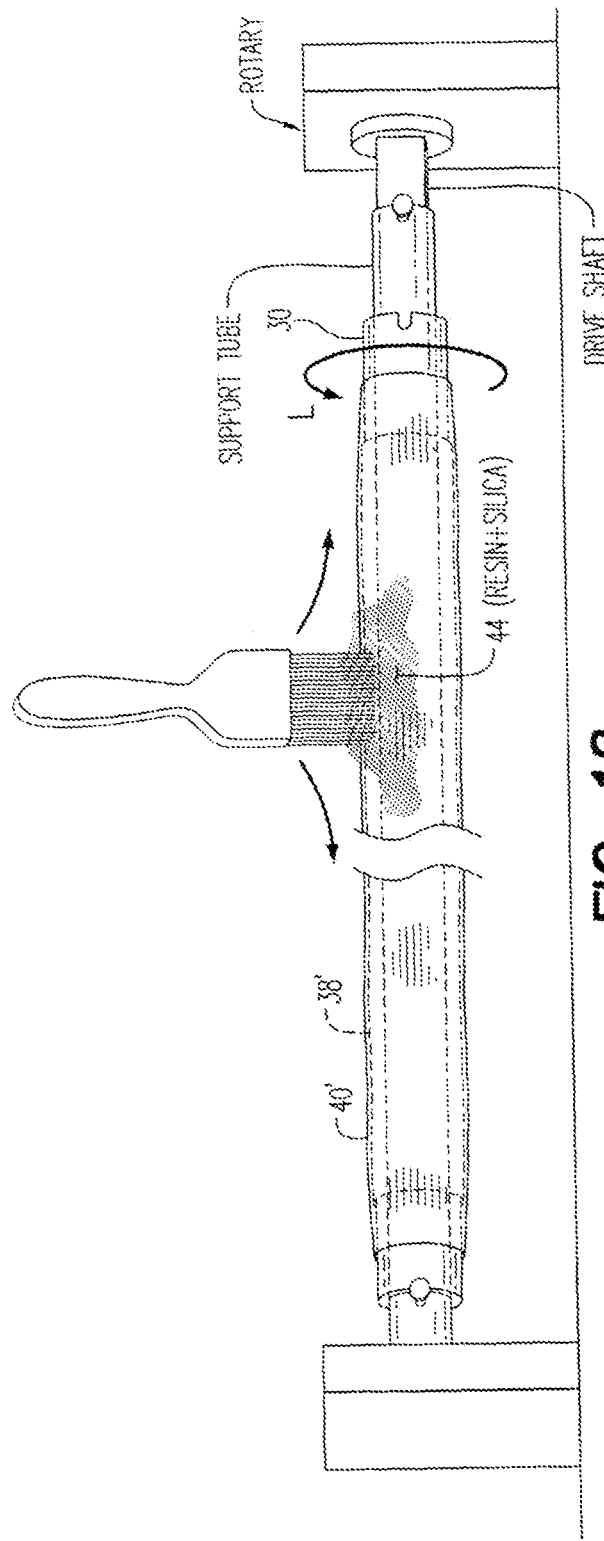
FIGS. 18 and 19 show an optional and preferred step of applying a resin/silica coating over the cured resin (FIG. 18) and hanging the end product vertically for curing.
Figure 19:
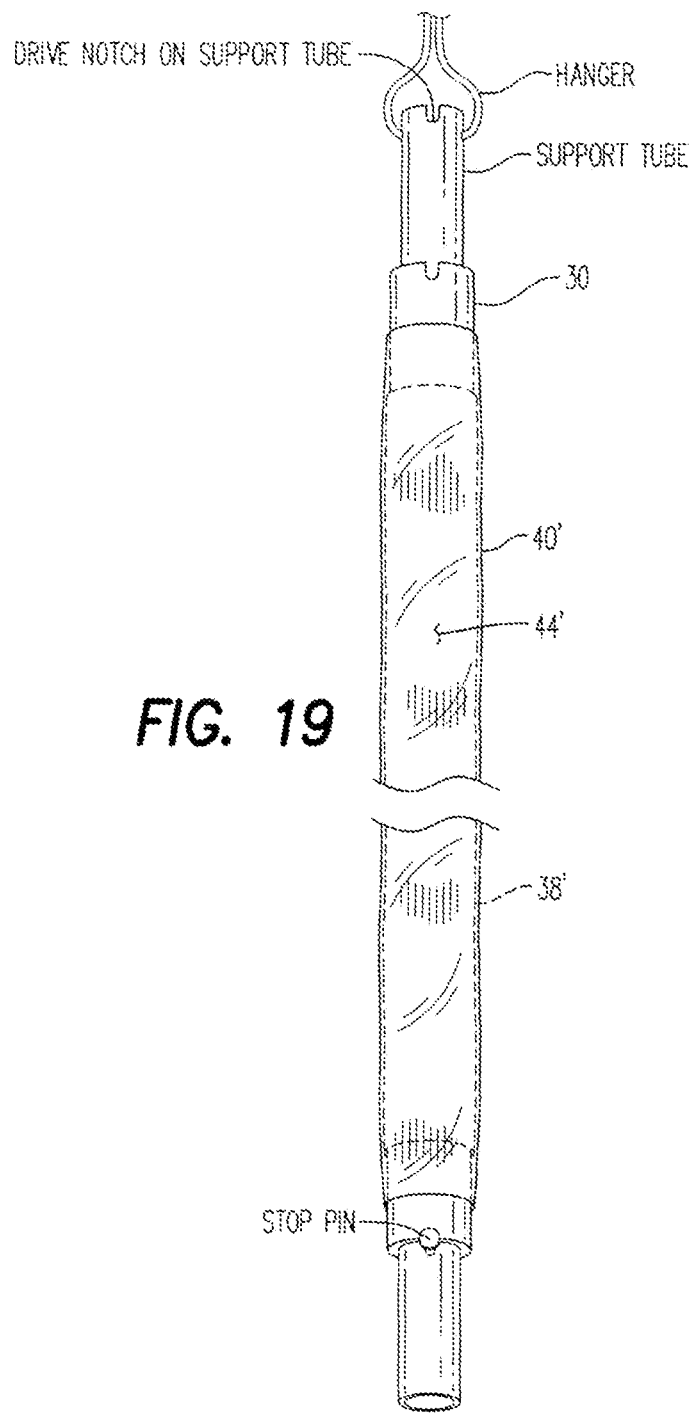

In FIG. 18, after the resin 42 has been cured and hardened, it is preferred that an outer layer of resin in combination with a small quantity of colloidal silica at 44 be brush applied while rotating the work product. Alternately, the entire arrangement is then removed from the rotary into an uptight orientation shown in FIG. 19 wherein the hanger is attached to an overhead support after a stop pin has been positioned through a transverse aperture through the support tube at the opposite end thereof. The colloidal silica/resin outer coat 44' provides a more serviceable and smoother surface.

Figure 21:
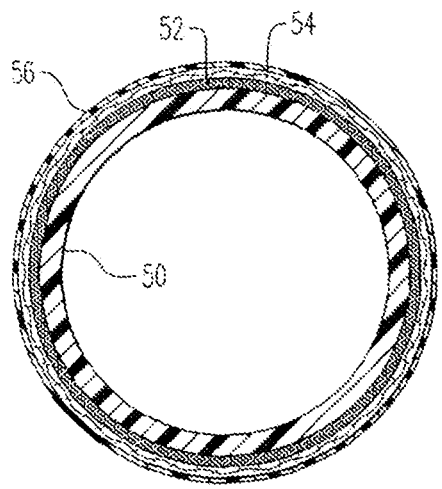
FIG. 21 is a section view in the direction of arrows 21-21 in FIG. 20.
Figure 21A:
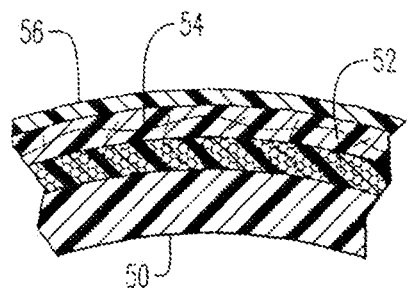
FIG. 21A is an enlarged view of a segment of pole section in FIG. 21.
Figure 21B:
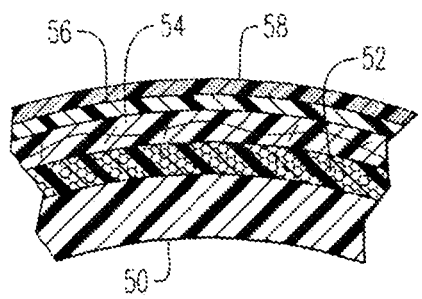
FIG. 21B is a view similar to FIG. 21A with an outer layer of colloidal silica.

Referring now to FIGS. 20, 21 and 21A, a segment of a length of carbon fiber pole is there shown at 46. Again, the finished carbon fiber 48 has a translucent or transparent visual effect through the cured resin 56 and the outer glass fiber sleeve 54 so that the black carbon fiber sleeve 52 is visible through these combined layers of resin and glass fiber sleeve. As seen in FIG. 21B, the preferred embodiment also includes the outer layer of cured resin with colloidal silica 58 which is applied manually over the cured surface of the resin 56 as previously described.

Referring now to FIG. 22, the tubular mandrel aspect of the present invention is applied to curved tubular structural members such as the support bow of a bimini top of a sailboat or power boat. In one embodiment 60, the PVC mandrel 62 is heated and formed at 64 so as to provide straight upright legs 66 and a large radius curved center portion 62 configured as aesthetically dictated for the bimini canvas. Alternately, the PVC mandrel may be formed in segmented portions at 70 wherein the center portion 72 is first heated and formed around a suitable form or manually and then interconnected to tightly bent corners 76 by connectors 78 for attachment to elongated upright tubular portions 74 to form the same desired configuration as with respect to the mandrel 60.

It is again stressed that the important aspect of this invention is that the inner mandrel becomes a permanent part of each hollow carbon fiber pole or contoured product. The resin is saturated through the outer layer of glass fiber and through the inner layer of carbon fiber sleeve to reach and become a monolithic part with the inner tubular mandrel which again may be formed of polyvinylchloride material, cardboard material or any other suitable material which affords a lightweight tubular inner form over which the carbon fiber sleeve, the glass fiber sleeve, and the resin are applied. While a number of exemplary aspects and embodiments have been discussed above, those of skill in the art will recognize certain modifications, permutations and additions and subcombinations thereof. It is therefore intended that the following appended claims and claims hereinafter introduced are interpreted to include all such modifications, permutations, additions and subcombinations that are within their true spirit and scope.

FIGS. 23 to 30 are side perspective views showing steps in implementing an alternate method of this disclosure to produce a socket 80 in an end pole product of this disclosure.

Figure 23:
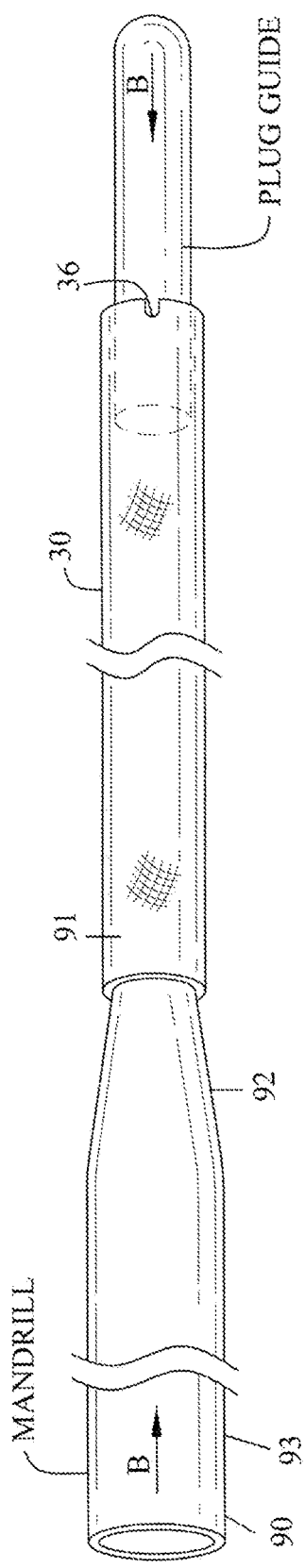

FIG. 23 illustrates a plug guide being slid part way into one end of the mandrel 30 in the direction of arrow B. A bell mandrel 90 has a narrow cylindrical portion 91, an enlarged cylindrical portion 92 and an intermediated tapered portion 93. The narrow cylindrical portion 91 is inserted into the other end of the mandrel 30

Figure 24:
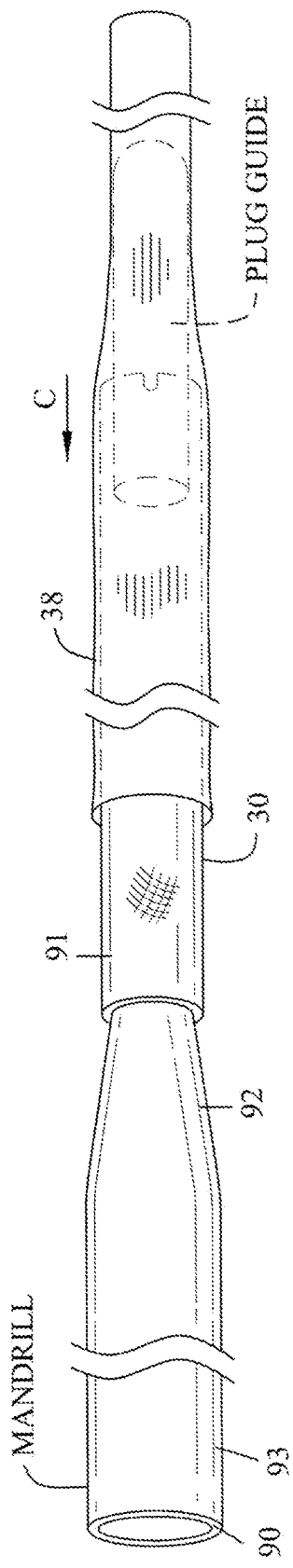

FIG. 24 illustrates a length of tubular carbon fiber sleeve 38 being slidingly engaged onto the outer surface of the mandrel 30 in the direction of arrow C.

Figure 25:
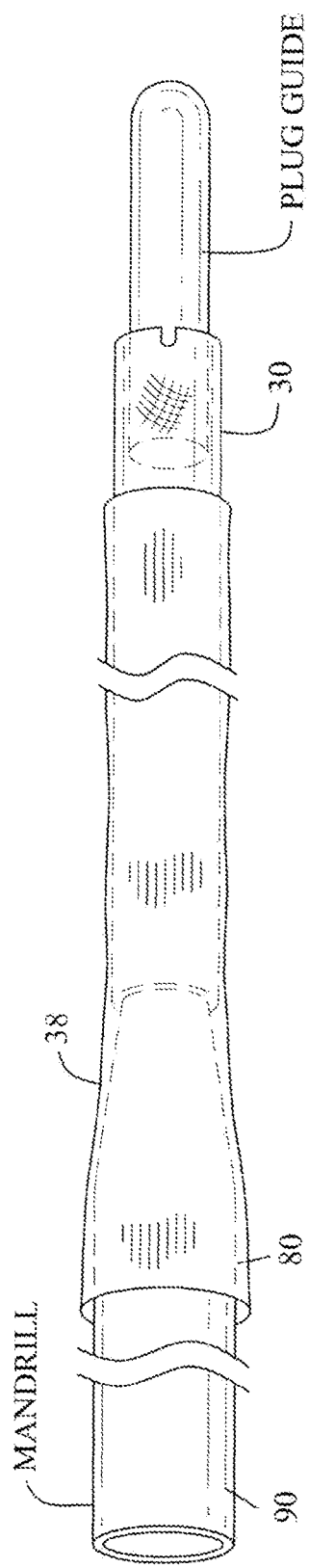

FIG. 25 illustrates the carbon fiber sleeve 38 is fully in place over the mandrel 30 and the intermediated tapered portion 93 and the enlarged cylindrical portion 92 of the bell mandrel 90.

Figure 26:
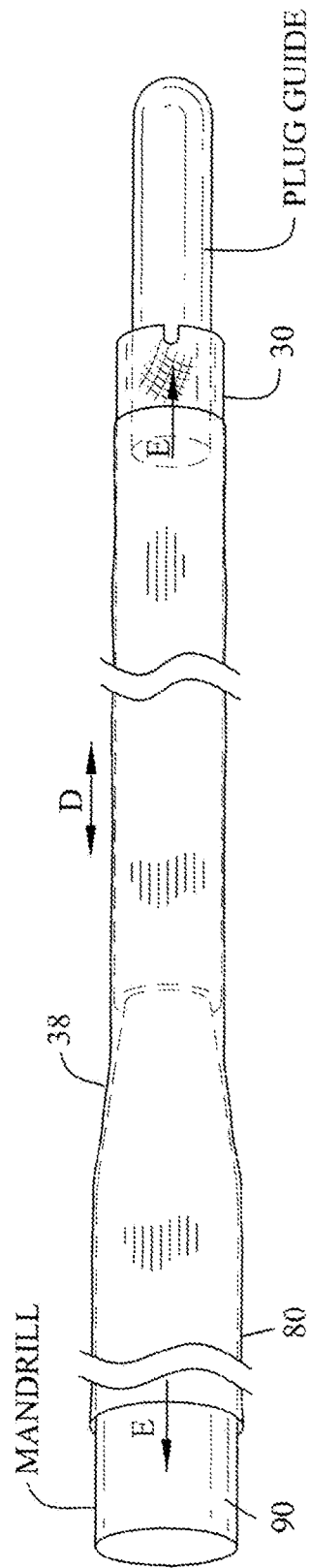

FIG. 26 illustrates the carbon fiber sleeve 38 being manually stretched as arrow D in the direction of arrows E so as to more tightly conform against the exterior surface of the mandrel 30 and the intermediated tapered portion 93 and the enlarged cylindrical portion 92 of the bell mandrel 90.

FIG. 27 illustrates a length of tubular glass or carbon fiber sleeve 40 is slid over the top of the carbon fiber sleeve 38 in the direction of arrow F.

FIG. 28 illustrates the length of tubular glass or carbon fiber sleeve 40 positioned over the previously stretched and tensioned carbon fiber sleeve 38 overlaying the intermediated tapered portion 93 and the enlarged cylindrical portion 92 of the bell mandrel 90.

FIG. 29 illustrates the glass or carbon fiber sleeve 40 being stretched in the direction of arrows G and tensioned in the direction of arrows H by manual manipulation thereof to insure outstretched and tightened position of the glass fiber sleeve 40.

Figure 13:
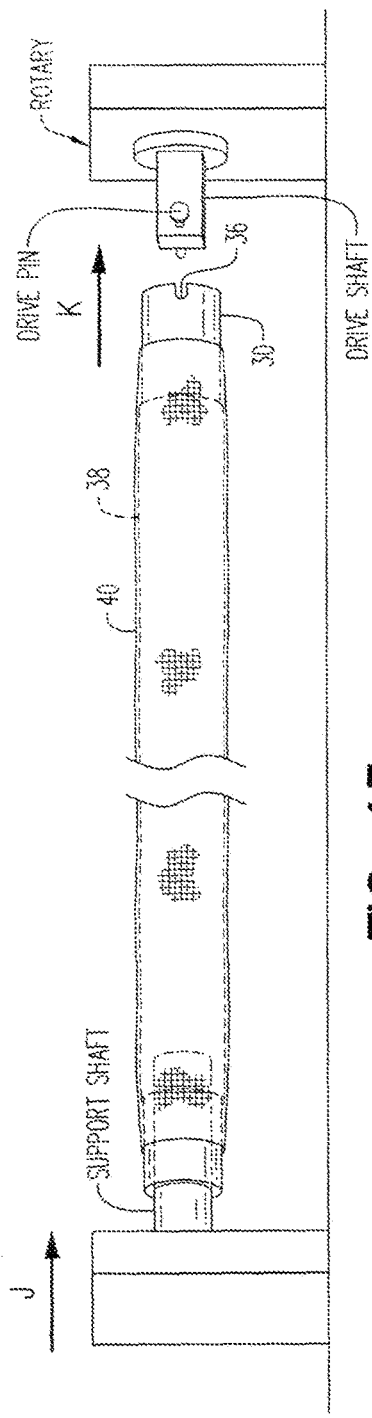
Figure 14:
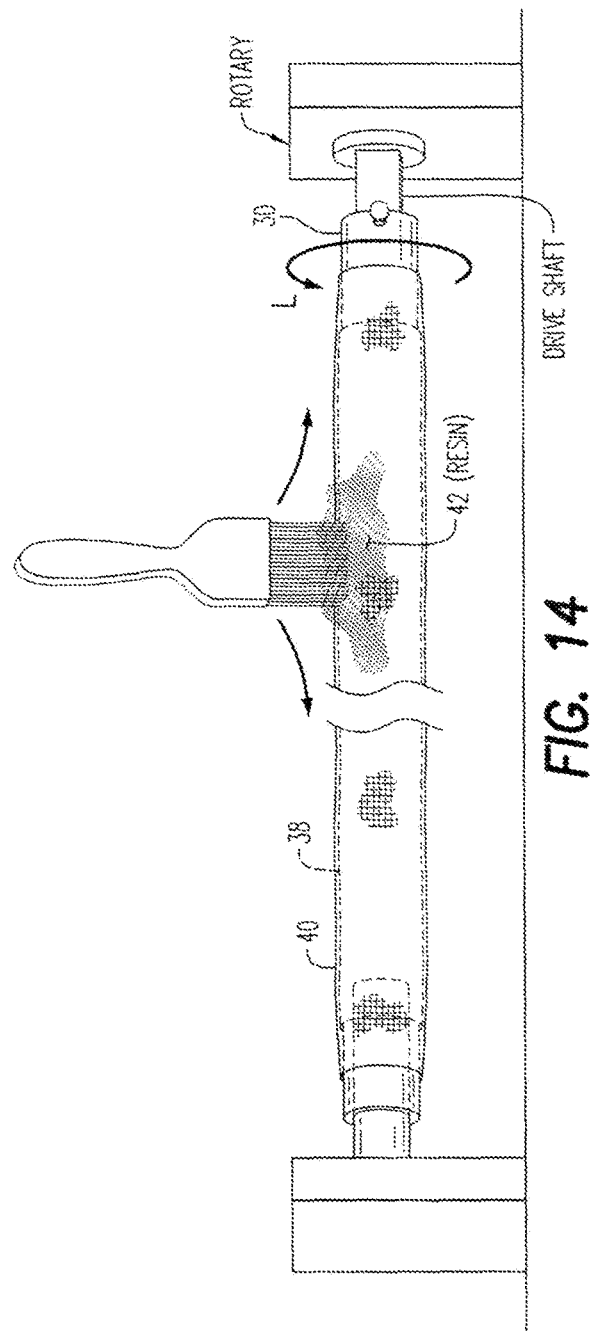

FIG. 30 illustrates the entire arrangement shown being positioned onto a rotary apparatus in a manner similar to the explanation previously referred to with reference to FIG. 13. The assembly is process in a manner as set forth in FIGS. 14 to 19. Thereafter the bell mandrel is removed to from the formed socket 80.

Figure 31:
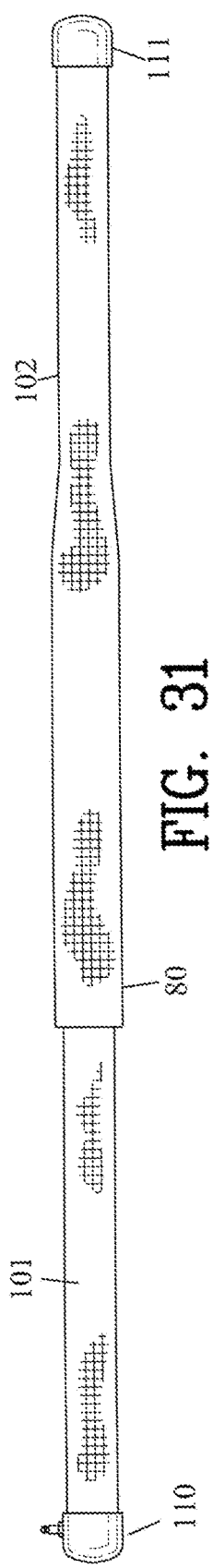
FIG. 31 is an assembled view of a first pole section of FIGS. 3 to 15 inserted into the socket of a second pole section of FIGS. 23 to 30.

FIG. 31 is an assembled view of a first pole section 101 of FIGS. 3 to 15 inserted into the socket 80 of a second pole section 102 of FIGS. 23 to 30. The integral socket enables the first pole section 101 to be inserted into the socket 80 of the second pole section 102 without the need for ferrules. The integral socket provides an increased strength and reduced the cost of the carbon fiber tubular pole.

Figure 32:
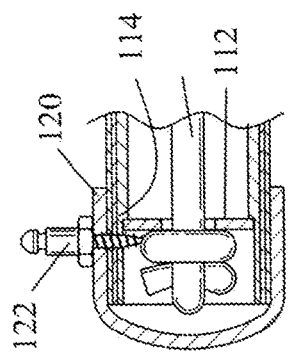
FIG. 32 is a sectional view along line 32-32 in FIG. 31.

FIG. 32 is a sectional view along line 32-32 in FIG. 31 illustrating an end unit 110 of the first pole sections 101. The second pole section 102 is fitted with a similar end unit 111. The end unit 110 comprises a washer stop 112 disposed in a recess 114 formed in the end of the first pole sections 101. An elastic cord 120 is stretched between the end unit 110 of the first pole sections 101 and a similar end unit 111. The elastic cord 120 maintains the first pole sections 101 inserted within the socket 80 of the second pole section 102. The end units 110 and 11 also include a canvas snap 122 (lift-a-dot) for mounting a canvas awning or the like.

Figure 33:
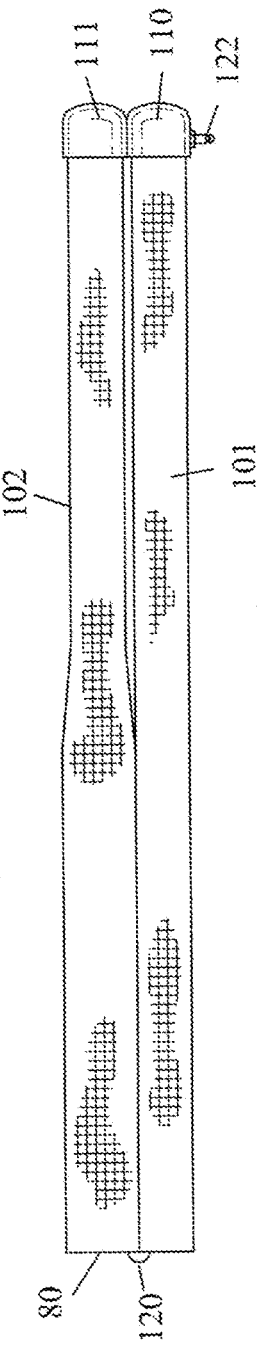
FIG. 33 is a view of the first and second pole sections of FIG. 30 in a folded position.

FIG. 33 is a view of the first and second pole sections of FIG. 30 in a folded position. The first pole section 101 is removed from the second pole section 102 and may be bent 180 degrees for easy storage.

FIGS. 34 to 51 illustrate a method of making the carbon fiber tubular components of FIGS. 1 to 33 utilizing a compression molding process. The compression molding process is substituted for the curing process set forth previously.

FIGS. 34 and 35 illustrate a bottom portion of a compression mold 130 having a bottom mold portion 141 having a bottom mold cavity 141. In this example, the bottom mold cavity 141 includes a narrow cylindrical portion 142 and an enlarged cylindrical portion 143 for forming the carbon fiber tubular pole having a socket 80 as shown in FIG. 23-30. However it should be understood that the compression molding process is suitable for forming any of the carbon fiber tubular members and components set forth herein.

A release agent 160 is positioned within the bottom mold cavity 141. Preferably, the release agent 160 comprises a sheet release agent held in position within the bottom mold cavity 141. The sheet release agent 160 extends between a first end 161 and a second end 162. Clear vinyl having a thickness of 0.012 inches is suitable for the sheet release agent 160. It should be understood that conventional release agent 160 may be used within the bottom mold cavity 141.

FIGS. 36 and 37 illustrate the application of a curable resin 42 to the carbon fiber sleeve 38 and the fiber sleeve 40 overlying the tubular mandrel 30. Preferably, the tubular mandrel 30 is rotated above the bottom mold cavity 141 during the application of the curable resin 42 as shown by the arrow. A rotating apparatus shown in FIG. 30 is suitable for rotating the tubular mandrel 30.

FIGS. 38 and 39 illustrate the insertion of the tubular mandrel 30 with the carbon fiber sleeve 38 and the fiber sleeve 40 into the bottom mold cavity 141. The second end 162 of the release agent 160 is wrapped over the tubular mandrel 30 for protecting a top portion 150 of the compression mold 130.

FIGS. 40 and 41 illustrate the top portion 150 of the compression mold 130 being positioned over the bottom portion 141 of the compression mold 130. The top portion 150 of the compression mold 130 has a top mold cavity 151 including a narrow cylindrical portion 152 and an enlarged cylindrical portion 153 symmetric with the bottom mold cavity 141.

FIGS. 42 and 43 illustrate an application of a compressive force 170 being applied to the compression mold 130. Preferably, a compressive force 170 is applied by either clamps or by a press at a three of approximately 100 pounds per square inch to 300 pounds per square inch. Excess uncured resin migrates to opposite ends of the bottom mold cavity 141.

FIGS. 44 and 45 illustrate the top mold portion 150 of the compression mold 130 being removed from the bottom mold portion 140 of a compression mold 130 after curing of the resin 42'. The second end 162 of the vinyl release agent 160 is pealed back to expose the top surface of the carbon fiber sleeve 38 and the fiber sleeve 40 bonded to the tubular mandrel 30.

FIGS. 46 and 47 illustrate the removal of the tubular mandrel 30 from the bottom mold portion 140 of a compression mold 130. Thereafter, the bell mandrel 90 is removed from the tubular mandrel 30. In some instances, the cured resin 42' may be post cured at an elevated temperature.

FIGS. 48 and 49 illustrate fabricated carbon fiber tubular component with the socket 80 defined in an end of the carbon fiber tubular component. A mold flashing 180 may be formed at the junction of the bottom mold portion 140 and the top mold portion 150. In this example, plural mold flashings 180 are shown formed on the fabricated carbon fiber tubular component.

Figure 51:
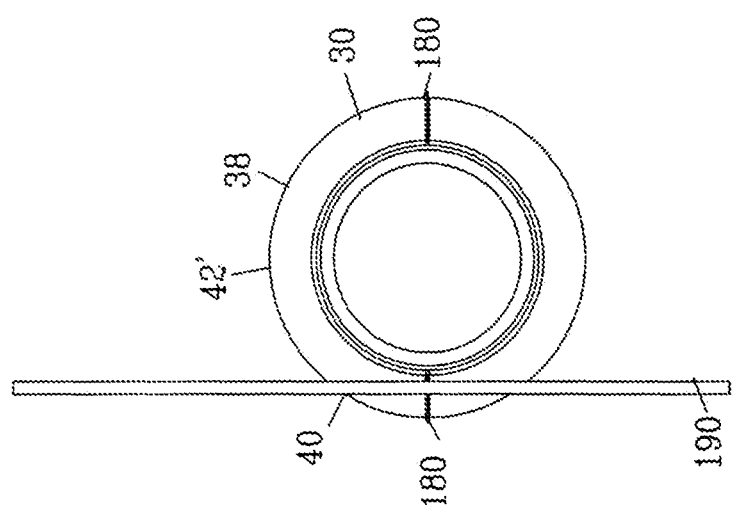
FIG. 51 is an enlarged side view of FIG. 50.
Figure 50:
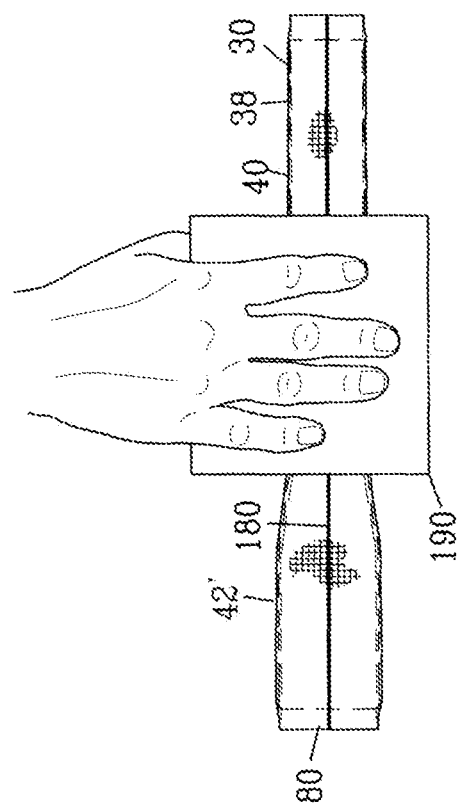
FIG. 50 is a view illustrating the finishing an outer surface of the carbon fiber tubular component.

FIGS. 50 and 51 illustrates the finishing an outer surface of the carbon fiber tubular component to remove the mold flashing 180. In this example, sandpaper 190 is applied to remove the mold flashing 180. However to be understood that various other techniques may be adopted for removing the mold flashing 180.

The compression curing process has several advantages over the air cure process as described herein. Firstly, the compression curing process holds the heat of the exothermic resin reaction within the compression mold 130. Secondly, the compression curing process reduces air bubbles within the resin 42; Thirdly, the compression curing process is more economical than air cure process. Finally, the compression curing process provides a smooth gloss exterior finish.

FIGS. 52 to 57 illustrate the process of forming a curved carbon fiber tubular coupling 200. In this example, the curved carbon fiber tubular coupling 200 shown having a ninety degree (90°) bend but it should be understood that the curved carbon fiber tubular coupling 200 may incorporate various angular dispositions.

FIG. 52 is an exploded view of a curved tubular member 210. Preferably, the curved tubular member 210 is formed of a polymeric material such as polyvinylaloride and the like. The curved tubular member 210 defines an outer diameter with 211. In some applications, the curved tubular member 210 may incorporate a conventional PVC elbow.

A support rod 220 carries a removable enlarged mandrel 230 having an outer diameter 231. The outer diameter 231 of the removable enlarged mandrel 230 is identical in size to the outer diameter 211 of the curved tubular member 210. A fastener 235 interlocks the removable enlarged mandrel 230 onto the support rod 220.

In this example, plural support rods 220 and removable enlarged mandrels 230 are shown but it should be understood that a single support rod 220 and removable enlarged mandrel 230 may be used in the curved carbon fiber tubular coupling 200. A release agent 165 is applied to the support rod 220 and the removable enlarged mandrel 230 be well known to those skilled in the art.

FIG. 53 is a view illustrating the insertion of support rod 220 into the curved tubular member 210 to abut the removable enlarged mandrels 230 against the curved tubular member 210. A vinyl tape may be applied at the juncture of the removable enlarged mandrels 230 and the curved tubular member 210 to prevent, permeation of resin there between.

FIG. 54 is a view illustrating the insertion of a carbon fiber sleeve 38 over the removable enlarged mandrels 230 and the curved tubular member 210. The carbon fiber sleeve 38 is applied as heretofore described.

FIG. 55 is a view illustrating the insertion of a fiber sleeve 40 over carbon fiber sleeve 40 and the application of the curable resin 42 in a manner as previously described. Preferably, the application of the curable resin 42 is accomplished in a rotational motion.

Figure 56:
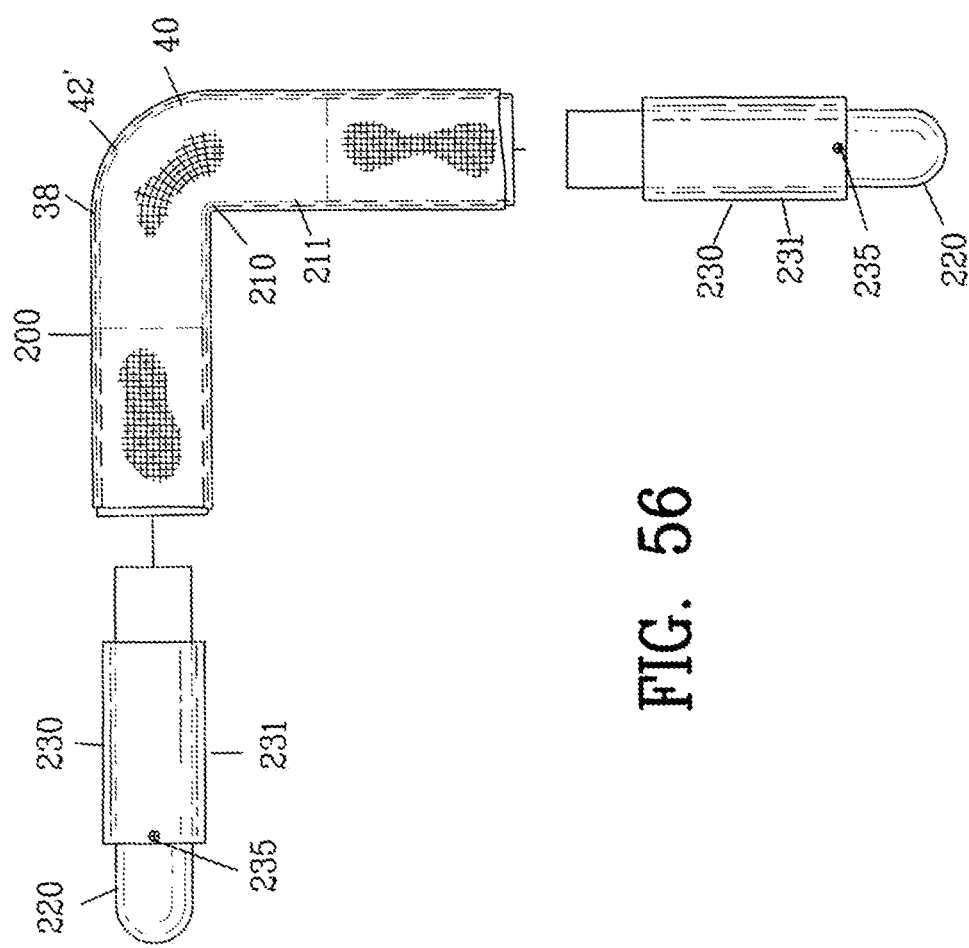
FIG. 56 is a view illustrating the removal of the removable mandrel from the curved tubular mandrel.

FIG. 56 is a view illustrating the removable of the removable enlarged mandrels 230 from the curved tubular member 210. The release agent 165 in combination with the fastener 235 facilitates removal of the removable enlarged mandrels 230 from the curved tubular member 210.

Figure 57:
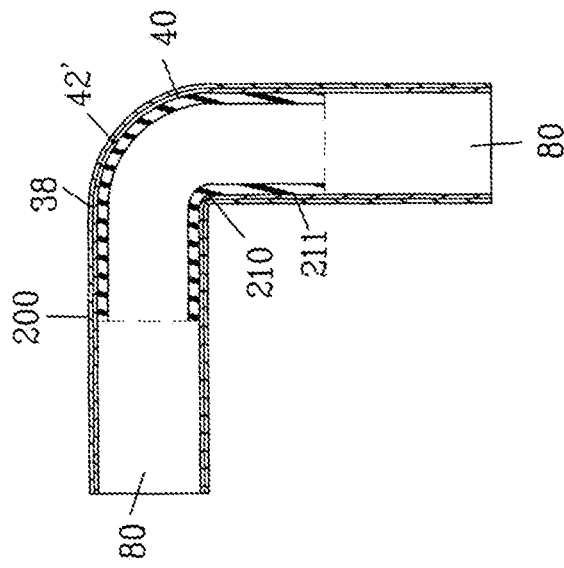
FIG. 57 is a sectional view of the carbon fiber tubular connector.

FIG. 57 is a sectional view of the carbon fiber tubular connector 200. The carbon fiber tubular connector 200 defines sockets 80 for receiving an adjacent carbon fiber tubular pole as previously shown. Preferably, the method of forming the carbon fiber tubular connector 200 utilizes the compression during process as heretofore described, The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of making a carbon fiber tubular pole comprising the steps of:
    providing a tubular mandrel defining a hollow interior;
    sliding a carbon fiber sleeve over the tubular mandrel;
    sliding a fiber sleeve over the carbon fiber sleeve;
    providing a compression mold having a mold cavity;
    inserting a sheet of a release agent into the bottom of the mold cavity;
    saturating the sleeves with a curable resin;
    inserting the tubular mandrel with the carbon fiber sleeve and the fiber sleeve into the mold cavity of the compression mold upon the sheet of a release agent;
    wrapping a portion of the sheet of the release agent over the tubular mandrel with the carbon fiber sleeve and the fiber sleeve within the mold cavity of the compression mold;
    compressing the compression mold for compressing the carbon fiber sleeve and the fiber sleeve with the uncured resin against the tubular mandrel;
    allowing the uncured resin to cure within the mold cavity and monolithically and permanently secure the tubular mandrel and the sleeves together to form the carbon fiber tubular pole;
    removing the cured carbon fiber tubular pole from the mold cavity of the compression mold; and
    removing the sheet of the release agent from the cured carbon fiber tubular pole.

2. A method of making a carbon fiber tubular pole as set forth in claim 1, wherein the step of providing a tubular mandrel includes providing an elongated linear tubular mandrel.

3. A method of making a carbon fiber tubular pole as set forth in claim 1, wherein the step of providing a tubular mandrel includes providing an elongated curved tubular mandrel.

4. A method of making a carbon fiber tubular pole as set forth in claim 1, the step of positioning the tubular mandrel with the fiber sleeves above the mold cavity of the compression mold; and
    rotating the tubular mandrel while applying a sufficient quantity of a curable resin to saturate through the sleeves to contact with the mandrel allowing any excess curable resin to fall into the mold cavity of the compression mold.

5. A method of making a carbon fiber tubular pole as set forth in claim 1, including the step of sanding an outer surface of the tubular mandrel.

6. A method of making as carbon fiber tubular pole as set forth in claim 1, including the step of sanding an outer surface of the tubular mandrel to remove mold flashing from the cured carbon fiber tubular pole.

7. A method of making a carbon fiber tubular pole comprising the steps of:
    providing a tubular mandrel defining a hollow interior;
    inserting, an enlarged bell mandrel adjacent to the tubular mandrel;
    sliding and stretching a carbon fiber sleeve over the tubular mandrel and the bell mandrel;
    sliding and stretching a fiber sleeve over the carbon fiber sleeve;
    saturating the sleeves with a curable resin through to the tubular mandrel;
    providing a compression mold having a mold cavity;
    inserting the tubular mandrel and bell mandrel with the carbon fiber sleeve and the fiber sleeve with the uncured resin into the mold cavity of the compression mold;
    compressing the compression mold for compressing the carbon fiber sleeve and the fiber sleeve with the uncured resin against the tubular mandrel and the bell mandrel;
    allowing the uncured resin to cure within the mold cavity and monolithically and permanently secure the tubular mandrel and the sleeves together to form the carbon fiber tubular pole;
    removing the cured carbon fiber tubular pole from the mold cavity of the compression mold; and
    removing the enlarged bell mandrel to provide a socket for receiving an adjacent carbon fiber tubular pole.

8. A method of making a carbon fiber tubular connector comprising the steps of:
    providing a tubular mandrel defining a hollow interior;
    positioning an enlarged mandrel adjacent to the tubular mandrel;
    sliding and stretching a carbon fiber sleeve over the tubular mandrel and the enlarged mandrel;
    sliding and stretching a fiber sleeve over the carbon fiber sleeve;
    saturating the sleeves with a curable resin through to the tubular mandrel; providing a compression mold having a mold cavity; inserting the tubular mandrel and the enlarged mandrel with the carbon fiber sleeve and the fiber sleeve with the uncured resin into the mold cavity of the compression mold; compressing the compression mold for compressing the carbon fiber sleeve and the fiber sleeve with the uncured resin against the tubular mandrel and the enlarged mandrel;
    allowing the uncured resin to cure and monolithic and permanently secure the tubular mandrel and the sleeves together to form the carbon fiber tubular connector; and
    removing the enlarged mandrel to provide a socket for receiving an adjacent carbon fiber tubular pole.

9. A method of making a carbon fiber tubular pole comprising the steps of:
   providing a tubular mandrel defining a hollow interior;
   sliding a carbon fiber sleeve over the tubular mandrel;
   providing a compression mold having a mold cavity;
   inserting a sheet of a release agent into the bottom of the mold cavity;
   saturating, the sleeve with a curable resin;
   inserting the tubular mandrel, with the carbon fiber sleeve into the mold cavity of the compression mold upon the sheet of a release agent;
   wrapping a portion of the sheet of the release agent over the tubular mandrel with the carbon fiber sleeve within the mold cavity of the compression mold;
   compressing the compression mold for compressing the carbon fiber sleeve with the uncured resin against the tubular mandrel;
   allowing the uncured resin to cure within the mold cavity and monolithically and permanently secure the tubular mandrel and the sleeve together to form the carbon fiber tubular pole;
   removing the cured carbon fiber tubular pole from the mold cavity of the compression mold; and
   removing the sheet of the release agent from the cured carbon fiber tubular pole.

* * * * *